United States Patent
Parr et al.

(10) Patent No.: US 10,215,252 B2
(45) Date of Patent: Feb. 26, 2019

(54) HYDRAULIC BODY MOUNT

(71) Applicant: Vibracoustic North America L.P., South Haven, MI (US)

(72) Inventors: Matthew Charles Parr, St. Joseph, MI (US); Steven Carleton Molesworth, South Haven, MI (US); Heath Allan Ehlinger, Ortonville, MI (US)

(73) Assignee: VIBRACOUSTIC NORTH AMERICA L.P., South Haven, MI (US)

( * ) Notice: Subject to any disclaimer, the term of this patent is extended or adjusted under 35 U.S.C. 154(b) by 49 days.

(21) Appl. No.: 15/691,887

(22) Filed: Aug. 31, 2017

(65) Prior Publication Data

US 2018/0066726 A1 Mar. 8, 2018

Related U.S. Application Data

(60) Provisional application No. 62/383,845, filed on Sep. 6, 2016.

(51) Int. Cl.
| | |
|---|---|
| *F16F 13/08* | (2006.01) |
| *F16F 13/10* | (2006.01) |
| *F16F 13/14* | (2006.01) |
| *F16F 13/16* | (2006.01) |

(52) U.S. Cl.
CPC ............ *F16F 13/10* (2013.01); *F16F 13/103* (2013.01); *F16F 13/1445* (2013.01); *F16F 13/1481* (2013.01); *F16F 13/16* (2013.01); *F16F 2224/025* (2013.01); *F16F 2224/0208* (2013.01); *F16F 2224/04* (2013.01); *F16F 2226/04* (2013.01); *F16F 2230/06* (2013.01);
(Continued)

(58) Field of Classification Search
CPC .. F16F 13/08; F16F 13/10; F16F 13/24; F16F 13/26; F16F 13/103
USPC ........................................ 267/140.11, 140.13
See application file for complete search history.

(56) References Cited

U.S. PATENT DOCUMENTS

| | | | |
|---|---|---|---|
| 4,796,875 A | 1/1989 | Mertens et al. | |
| 4,936,556 A | 6/1990 | Makibayashi et al. | |
| (Continued) | | | |

FOREIGN PATENT DOCUMENTS

| | | |
|---|---|---|
| DE | 3701264 A1 | 7/1988 |
| EP | 2554872 A2 | 2/2013 |
| (Continued) | | |

OTHER PUBLICATIONS

International Search Report—PCT/US2017/049855, dated Dec. 22, 2017.

*Primary Examiner* — Christopher P Schwartz
(74) *Attorney, Agent, or Firm* — Fishman Stewart PLLC

(57) ABSTRACT

A hydraulic body mount with a combined rubber cushion and a hydraulic module may include an inner shaft, a mounting plate, a mounting bracket, a main rubber element, an inner ring, a fluid track, an upper bellows, a washer, a lower bellows, an outer can, a rate plate, a lower bushing, a crash washer, a doubler plate, and a retainer bracket. The fluid track may be configured to receive a fluid via a fluid port. The upper and/or lower bellows may be configured to interact with the fluid. The rate plate may be configured to engage the lower bushing and may be deformed when receiving the at least a portion of the inner shaft.

20 Claims, 28 Drawing Sheets

(52) U.S. Cl.
CPC ....... *F16F 2230/30* (2013.01); *F16F 2230/32* (2013.01)

(56) References Cited

U.S. PATENT DOCUMENTS

| | | | | |
|---|---|---|---|---|
| 5,246,212 A | * | 9/1993 | Funahashi | F16F 13/26 180/312 |
| 5,314,173 A | * | 5/1994 | Ide | F16F 13/26 267/140.14 |
| 2004/0004317 A1 | | 1/2004 | Hatano et al. | |
| 2006/0261531 A1 | | 11/2006 | Kim | |
| 2013/0015614 A1 | * | 1/2013 | Bradshaw | F16F 13/16 267/140.13 |
| 2013/0033054 A1 | * | 2/2013 | Wittmershaus | F16F 13/24 296/1.03 |

FOREIGN PATENT DOCUMENTS

| | | |
|---|---|---|
| FR | 2659711 A1 | 9/1991 |
| FR | 2839763 A1 | 11/2003 |
| FR | 2918953 A1 | 1/2009 |

\* cited by examiner

HYDRAULIC BODY MOUNT

THE CROSS-REFERENCE TO RELATED APPLICATIONS

This application claims the benefit of U.S. provisional application No. 62/383,845, filed Sep. 6, 2016 (the '845 application). The '845 application is hereby incorporated by reference as though fully set forth herein.

BACKGROUND a. Technical Field

The present disclosure relates to hydraulic body mounts, including methods and systems including hydraulic body mounts.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

A vehicle body may experience vibration and/or sharp impacts (e.g., shocks), during operation. A body mount, such as a hydraulic body mount, may be placed between the vehicle body and another component, such as the vehicle frame. The hydraulic body mount may be configured to dissipate and/or minimize vibration and/or shocks transmitted to the vehicle body. The hydraulic body mount may include a compartment to receive a liquid and/or flexible components to interact with the liquid to dissipate and/or minimize vibration and/or shocks received by the hydraulic body mount from the vehicle frame.

The foregoing discussion is intended only to illustrate the present field and should not be taken as a disavowal of claim scope.

SUMMARY

A hydraulic (e.g., fluid), body mount with a combined rubber cushion and hydraulic module may include an inner shaft, a mounting plate, a mounting bracket, a main rubber element, an inner ring, a fluid track, an upper bellows, a washer, a lower bellows, an outer can, a rate plate, a lower bushing, a crash washer, a doubler plate, and/or a retainer bracket. The fluid track may be configured to receive a hydraulic liquid. The upper and/or lower bellows may be configured to interact with the hydraulic liquid. The rate plate may be configured to engage the lower bushing and/or the inner shaft.

In an embodiment, a hydraulic body mount assembly may include an inner shaft, a plate secured to the inner shaft, a main rubber element formed about at least a portion of the inner shaft, plate, and a mounting bracket, an upper bellows formed about a fluid track, the upper bellows configured to engage the inner shaft, a lower bellows configured to engage the inner shaft and the fluid track, an outer can including a lower bushing and a rate plate, wherein the lower bushing and the rate plate is configured to receive the inner shaft, mounting bracket, upper bellows, fluid track, and lower bellows, and a retainer bracket that secures a crash washer to the lower bushing via the inner shaft.

In an embodiment, a hydraulic body mount assembly may include a rate plate that may include a plurality of members joined by at least one frangible element. In an embodiment, a hydraulic body mount assembly may include a rate plate that may be configured to be at least partially encapsulated within the lower bushing. In an embodiment, a hydraulic body mount assembly may include a rate plate that may be configured to at least partially deform upon insertion of the inner shaft into the lower bushing and the rate plate. In an embodiment, a hydraulic body mount assembly may include at least a portion of at least one of the inner shaft, the plate, the mounting bracket, the first inner ring, the second inner ring, the washer, the outer can, the fluid track, the rate plate, the crash washer, the doubler plate, and the retainer bracket may be coated with at least one of a corrosion preventer, a primer, and an adhesive. In an embodiment, a hydraulic body mount assembly may include an upper bellows that may include a first inner ring with at least one hole and a lower bellows that may include a second inner ring with at least one hole and a washer. In an embodiment, a hydraulic body mount assembly may include a fluid track that may include at least one fluid fill port and/or at least one fluid passage. In an embodiment, a hydraulic body mount assembly may include a fluid track that may be configured to receive one or more liquids via the fluid fill port.

In an embodiment, a hydraulic body mount assembly may include an inner shaft, a plate secured to the inner shaft, a main rubber element formed about the inner shaft, plate, and a mounting bracket, a fluid track including an upper bellows and a lower bellows, the upper bellows and the lower bellows configured to engage the inner shaft and the fluid track, an outer can including a lower bushing and a rate plate, wherein the lower bushing and the rate plate are configured to receive the inner shaft, mounting bracket, upper bellows, fluid track, and lower bellows, and a retainer bracket that secures a crash washer to the lower bushing via the inner shaft.

In an embodiment, a hydraulic body mount assembly may include a rate plate that may include a plurality of members joined by at least one frangible element. In an embodiment, a hydraulic body mount assembly may include a rate plate that may be configured to be at least partially encapsulated within the lower bushing. In an embodiment, a hydraulic body mount assembly may include when an inner shaft that is inserted into an outer can, at least a portion of a rate plate and/or a lower bushing may be deformed.

In an embodiment, a method for producing a hydraulic body mount may include securing an inner shaft to a plate, molding a main rubber element about the inner shaft, the plate, and a mounting bracket, securing an upper bellows to a fluid track, inserting the upper bellows and the fluid track onto the inner shaft and sealing against the mounting bracket, inserting a lower bellows onto the inner shaft and sealing against the fluid track and the upper bellows, overmolding at least a portion of a rate plate into an outer can, forming a lower bushing, inserting the outer can, lower bushing, and the rate plate onto the inner shaft, securing a doubler plate on the outer can, and installing a crash washer onto the lower bushing and the inner shaft, wherein the crash washer is secured to the inner shaft and lower bushing via a retainer bracket.

In an embodiment, a method for producing a hydraulic body mount may include a rate plate that may include a plurality of members joined by at least one frangible element. In an embodiment, a method for producing a hydraulic body mount may include a rate plate that may be configured to be at least partially encapsulated within a lower bushing. In an embodiment, a method for producing a hydraulic body mount may include a rate plate that may be configured to at least partially deform upon insertion of an inner shaft into a lower bushing and a rate plate. In an embodiment, a method for producing a hydraulic body mount may include an upper bellows that may be formed to include a first inner ring. In an embodiment, a method for producing a hydraulic body mount may include a lower bellows that may be formed to include a second inner ring and a washer and/or may be secured to the fluid track via an adhesive. In an embodiment, a method for producing a hydraulic body mount may include coating at least a portion of the inner shaft, the plate, the mounting bracket, the first inner ring, the second inner ring, the washer, the outer can, the fluid track, the rate plate, the crash washer, the doubler plate, and/or the retainer bracket with at least one of a corrosion preventer, a primer, and/or an adhesive. In an embodiment, a method for producing a hydraulic body mount may include evacuating a fluid track by applying a vacuum and/or filling the fluid track with at least one liquid via the fluid fill port.

The foregoing and other aspects, features, details, utilities, and advantages of the present disclosure will be apparent from reading the following description and claims, and from reviewing the accompanying drawings.

DETAILED DESCRIPTION

Figure 1A:
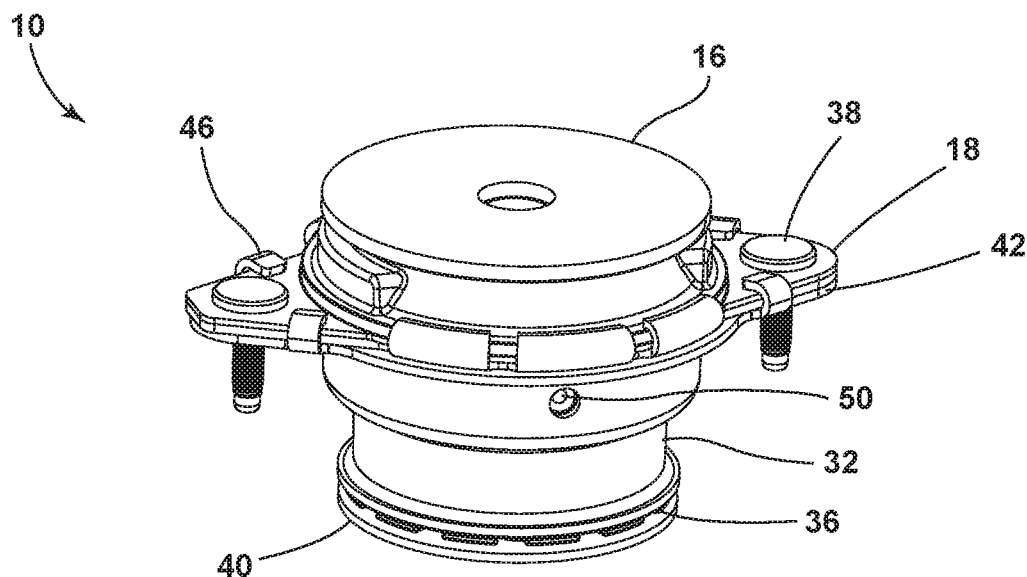
FIG. 1A is a top perspective view generally illustrating an embodiment of a hydraulic body mount, in accordance with teachings of the present disclosure.
Figure 1B:
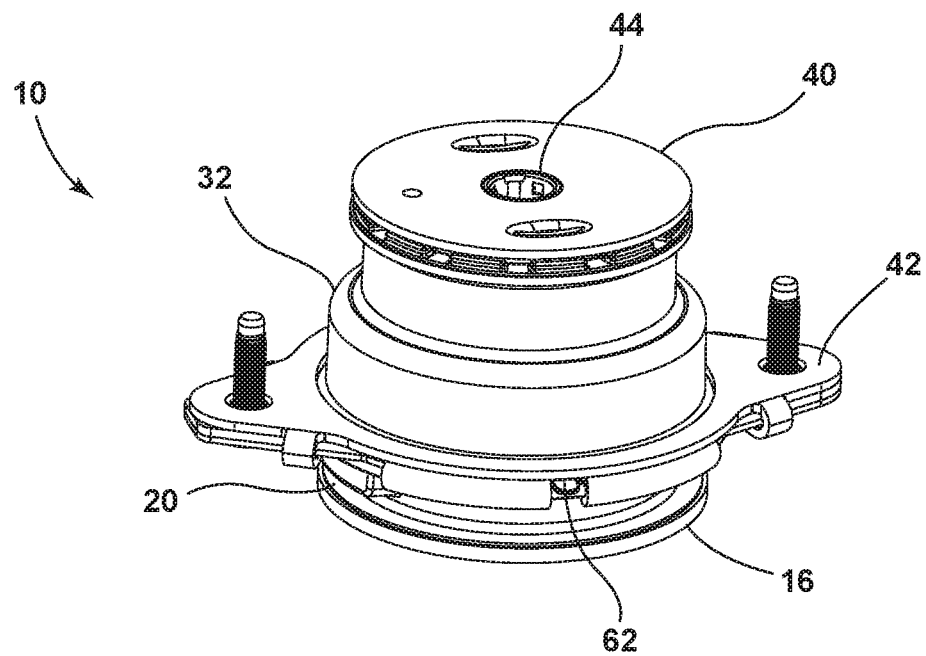
FIG. 1B is a bottom perspective views generally illustrating an embodiment of a hydraulic body mount, in accordance with teachings of the present disclosure.
Figure 2A:
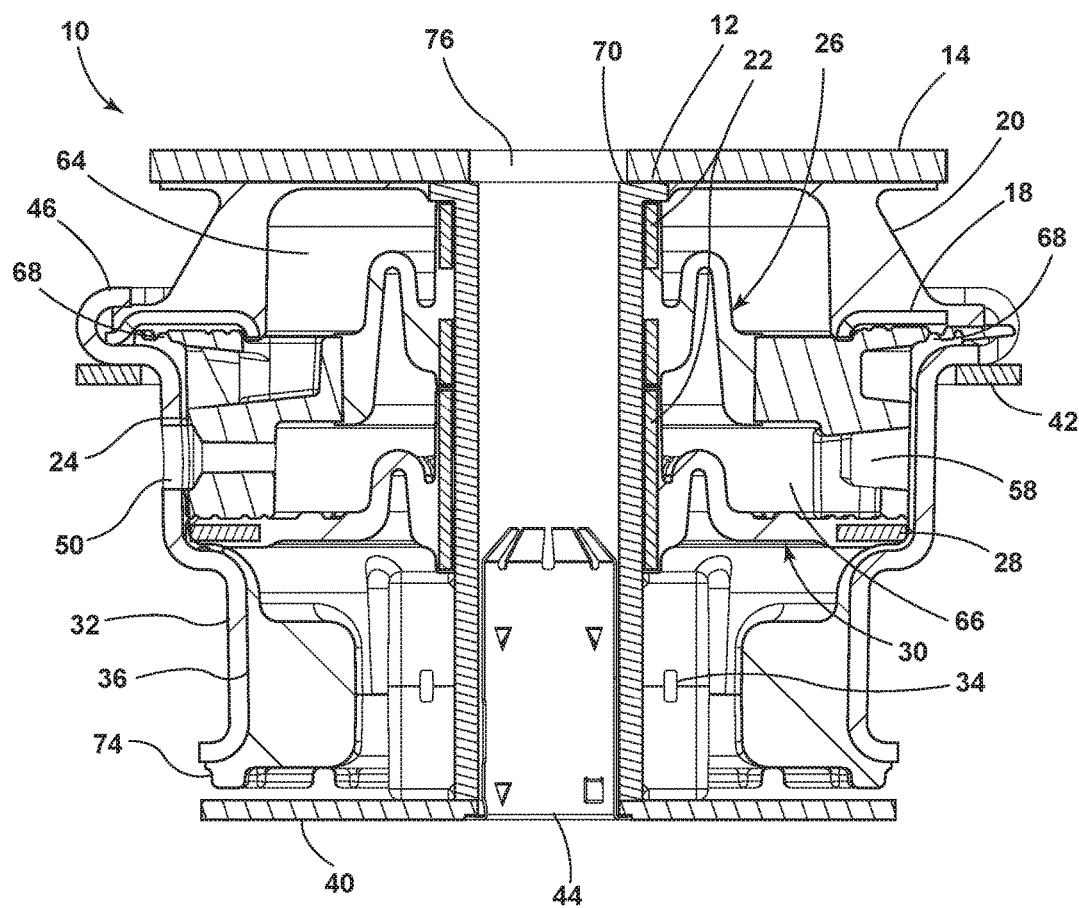
FIG. 2A is a sectional view generally illustrating an embodiment of a hydraulic body mount, in accordance with teachings of the present disclosure.
Figure 2B:
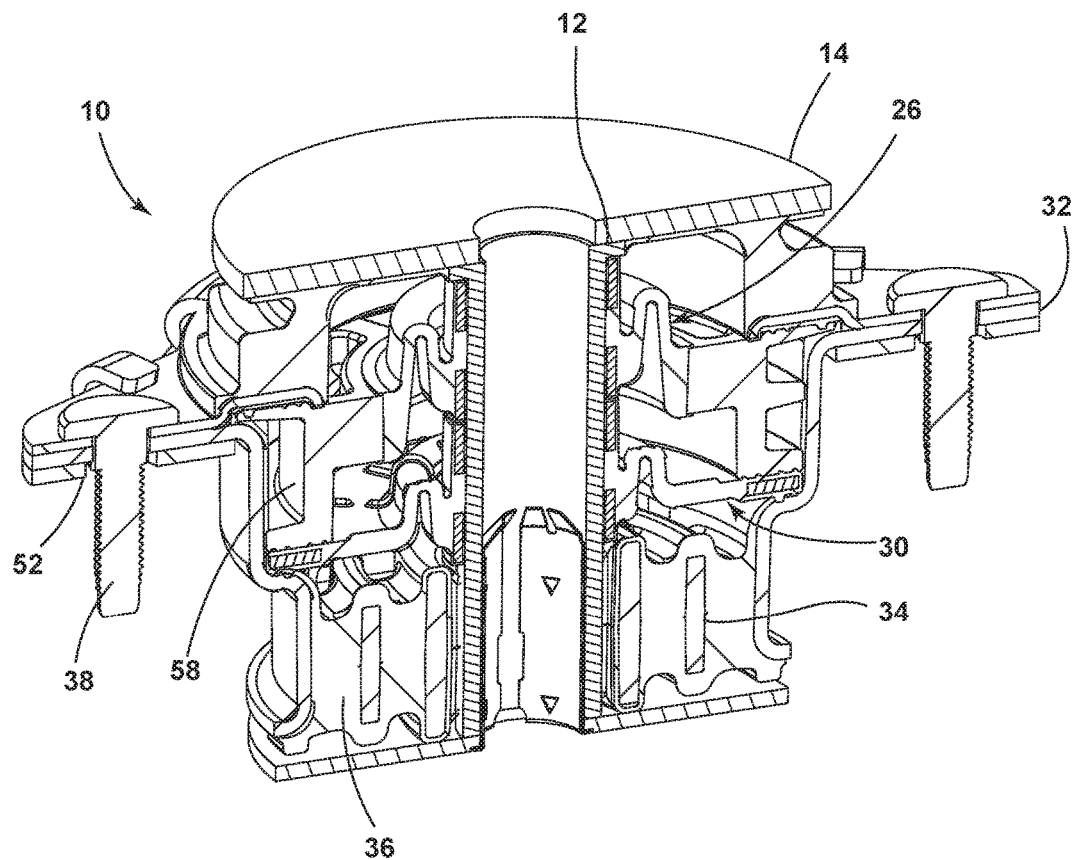
FIG. 2B is a perspective sectional view generally illustrating an embodiment of a hydraulic body mount, in accordance with teachings of the present disclosure.
Figure 4A:
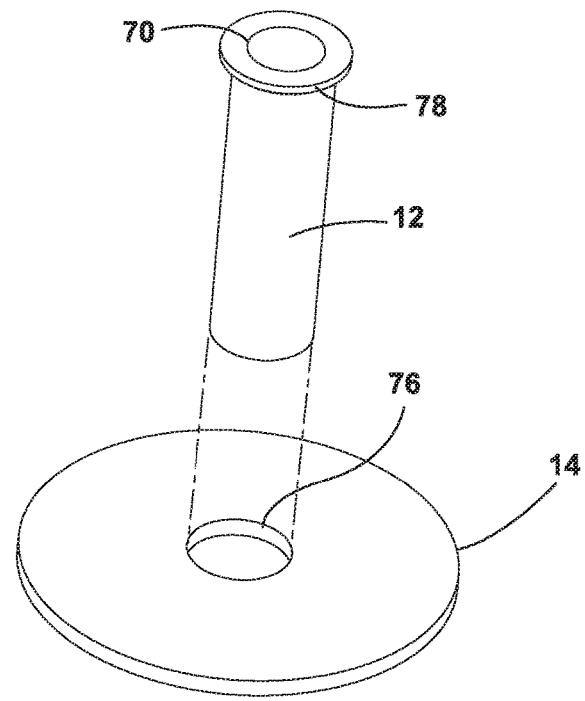
FIG. 4A is a perspective view generally illustrating embodiments of an inner shaft, plate and inner metal assembly associated with the hydraulic body mount of FIGS. 2A-2B, in accordance with teachings of the present disclosure.
Figure 4B:
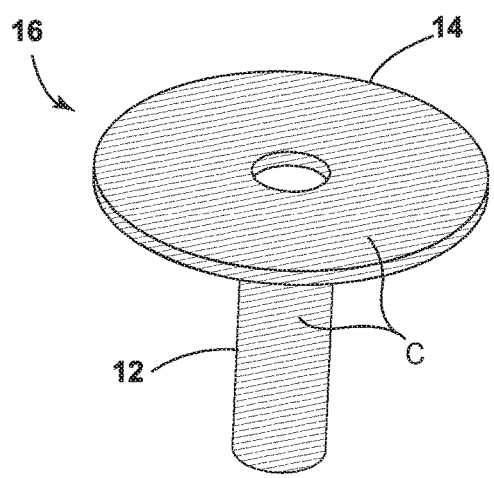
FIG. 4B is a perspective view generally illustrating embodiments of an inner shaft, plate and inner metal assembly associated with the hydraulic body mount of FIGS. 2A-2B, in accordance with teachings of the present disclosure.
Figure 4C:
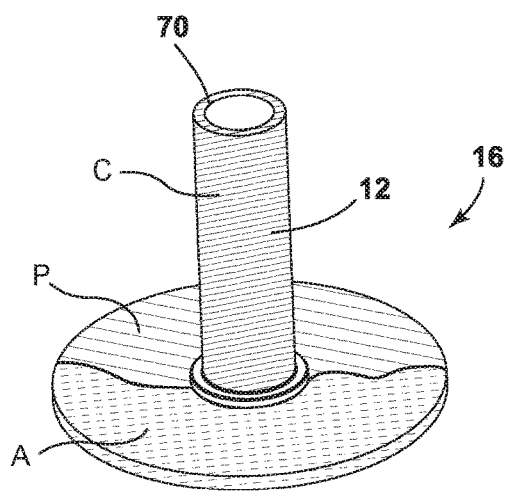
FIG. 4C is a perspective view generally illustrating embodiments of an inner shaft, plate and inner metal assembly associated with the hydraulic body mount of FIGS. 2A-2B, in accordance with teachings of the present disclosure.
Figure 6A:
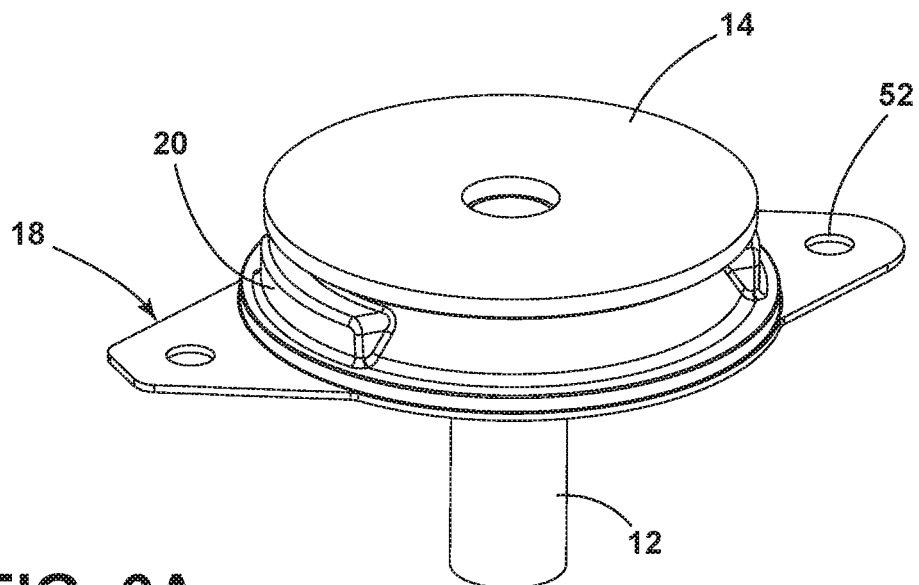
FIG. 6A is a perspective view generally illustrating embodiments of an inner shaft, a plate, and a main rubber element associated with the hydraulic body mount of FIGS. 2A-2B and FIGS. 4A-4C, in accordance with teachings of the present disclosure.
Figure 6B:
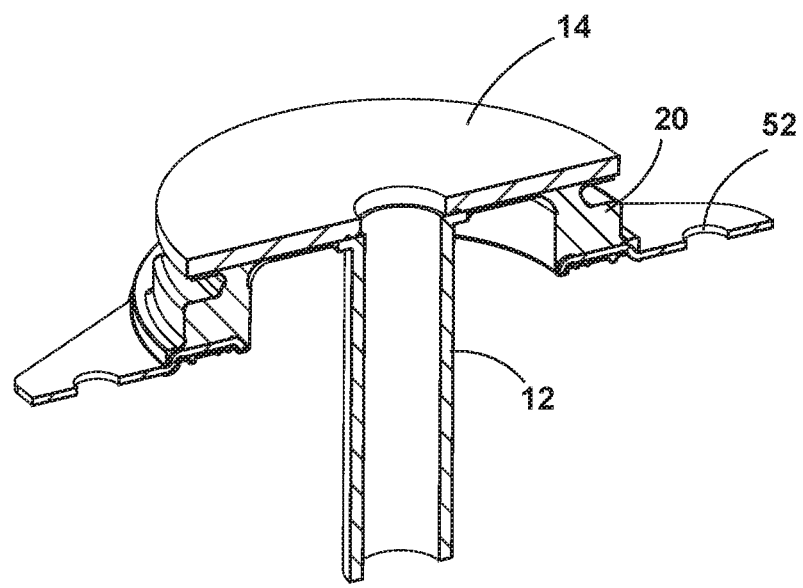
FIG. 6B is a sectional view generally illustrating embodiments of an inner shaft, a plate, and a main rubber element associated with the hydraulic body mount of FIGS. 2A-2B and FIGS. 4A-4C, in accordance with teachings of the present disclosure.

Referring now to the drawings, FIGS. 1A-1B generally illustrate an embodiment of hydraulic body mount 10. The hydraulic body mount 10 may include an inner shaft 12, which may be connected to a plate 14 and/or form an inner subassembly 16 (as shown in FIGS. 4A-4C). A main rubber element (MRE) 20 may be disposed (e.g., molded), about inner subassembly 16 and/or a mounting bracket 18 (as shown in FIGS. 6A-6B). An outer can 32 may be reinforced by mounting bracket 18 and/or a doubler plate 42. Tabs 46 may be crimped (e.g., compressed), to secure mounting bracket 18 and/or doubler plate 42 to outer can 32. A locator 62 of a fluid track 24 (as shown in FIGS. 2A-2B), may be configured to engage a space between tabs 46. The arrangement of locator 62 and tabs 46 may be configured to align fill port 50 of fluid track 24 with fill port 50 of outer can 32. A liquid (e.g., glycol), may be placed into the interior of hydraulic body mount 10 and into fluid track 24 via fill port 50 and/or sealed via a plug (or other sealing device) (not shown). One or more stake bolts 38 may engage holes 52 (as shown in FIG. 2B), in mounting bracket 18, outer can 32, and/or doubler plate 42. A lower bushing 36 may be molded into outer can 32. A retainer bracket 44 may be configured to secure crash washer 40 against inner shaft 12 (as shown in FIG. 2A).

FIGS. 2A-2B generally illustrates an embodiment of FIGS. 1A and 1B, an embodiment of the hydraulic body mount 10 that may include inner shaft 12 that may be connected (e.g., welded, bonded), to plate 14. Inner shaft 12 may include a hole 70. Plate 14 may include a plate hole 76. Main rubber element ("MRE") 20 may be formed (e.g., molded), around at least a portion of inner shaft 12, plate 14, and/or mounting bracket 18. In embodiments, one or more inner rings 22 may be integrated (e.g., over molded), into an upper bellows 26 and/or a lower bellows 30. Upper bellows 26 may be attached (e.g., bonded), to a fluid track 24. A washer 28 may be integrated into lower bellows 30. Outer can/housing 32 may be configured to receive fluid track 24, upper bellows 26, and/or lower bellows 30. In embodiments, outer can 32 may include an integrated (e.g., over molded), lower bushing 36, one or more snubbers 74, and/or a rate plate 34. Stake bolts 38 may be configured to engage mounting bracket 18, outer can 32, and/or doubler plate 42. Crash washer 40 may be configured to engage inner shaft 12, retainer bracket 44, and/or snubbers 74. Fill port 50 may be included in fluid track 24 and/or outer can 32. Mounting holes 52 may be configured in mounting bracket 18, outer can 32, and/or a doubler plate 42 to receive stake bolts 38. Fluid track 24 may include passages 58 though which fluid (e.g., glycol), may flow (e.g., travel), and/or be stored (e.g., contained). An upper chamber 64 and/or a lower chamber 66 may be included in hydraulic body mount 10. Fluid may flow (e.g., circulate), between upper chamber 64 and/or lower chamber 66 via fluid track 24. Seals 68 may be included between mounting plate 18 and outer can 32 and/or lower bellows 30 and/or outer can 32 and lower bellows 30. It should be understood that with respect to this application, the term "fluid" includes liquids and/or gases, as well as any combination thereof.

Figure 3A:
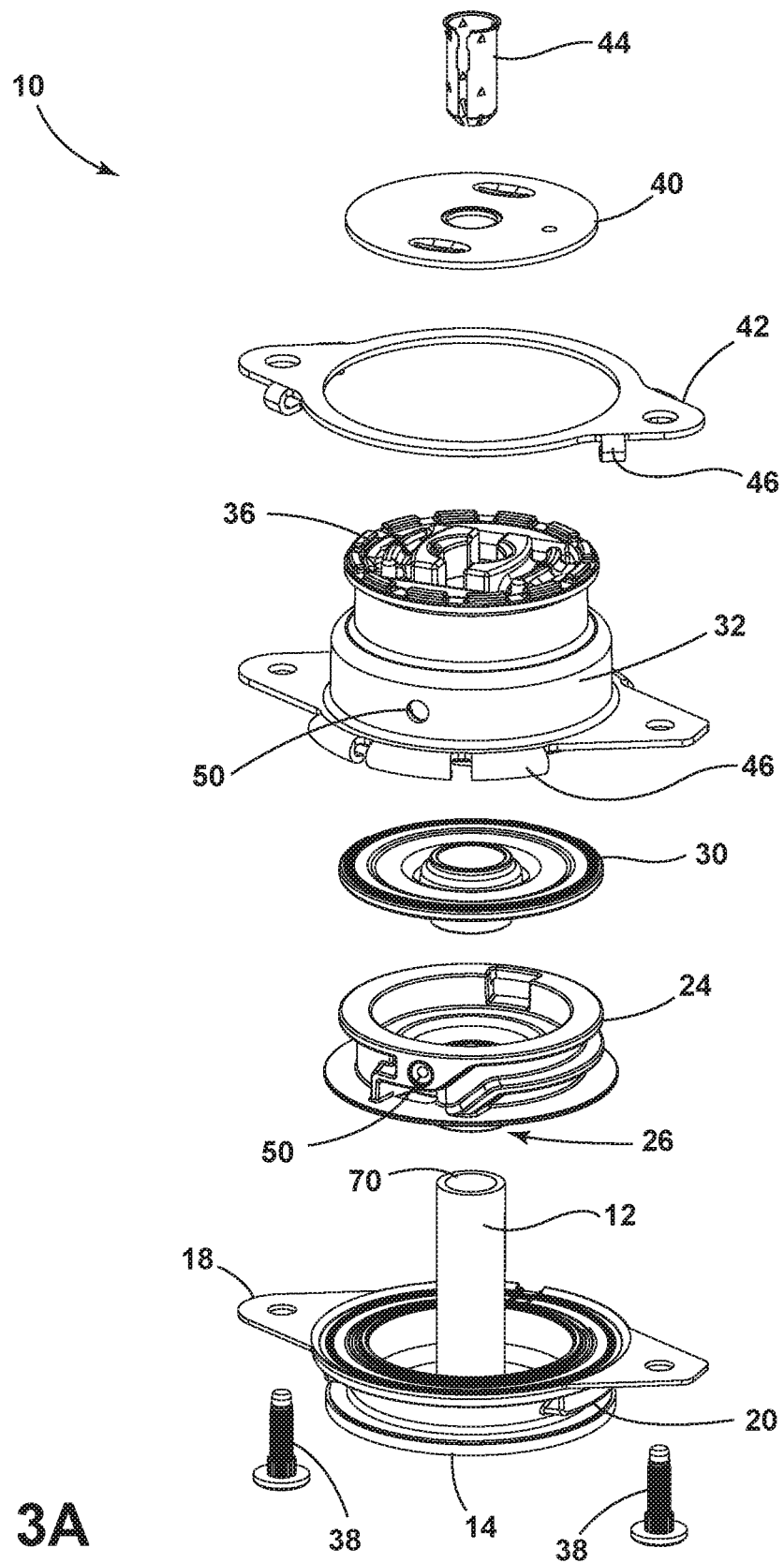
FIG. 3A is an exploded view generally illustrating an embodiment of a hydraulic body mount, in accordance with teachings of the present disclosure.
Figure 15A:
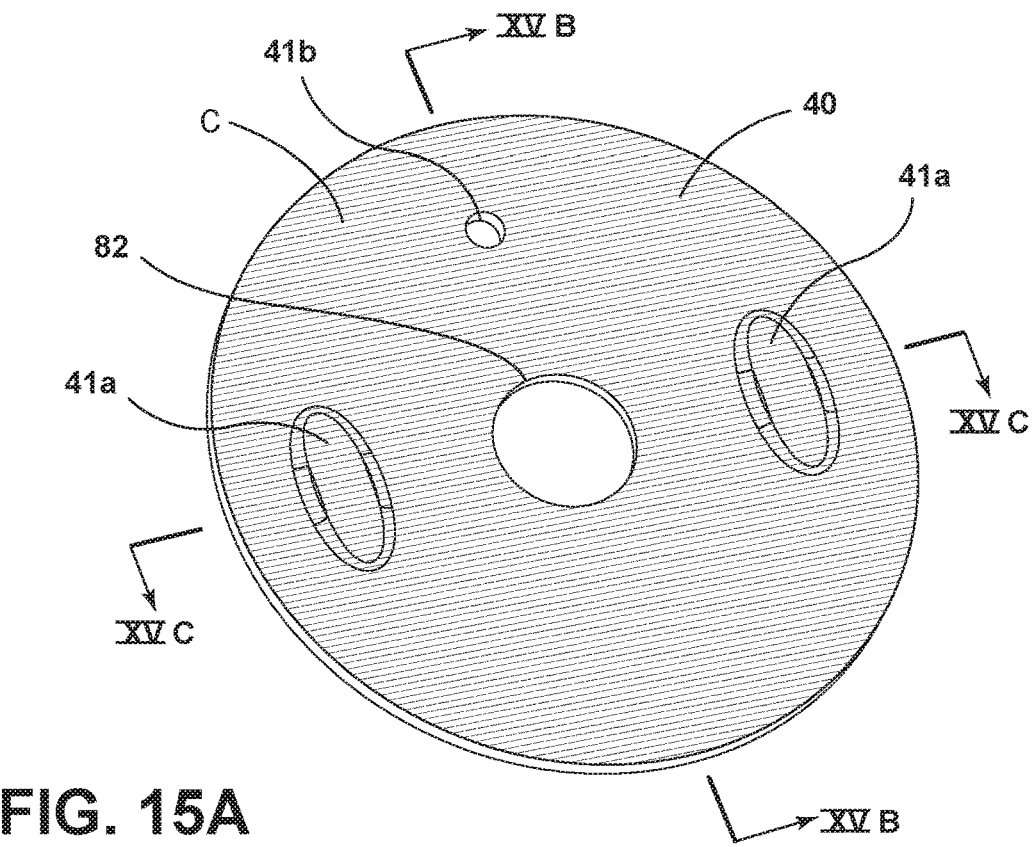
FIG. 15A is a perspective view generally illustrating embodiments of a crash washer associated with a hydraulic body mount, in accordance with teachings of the present disclosure.
Figure 15B:
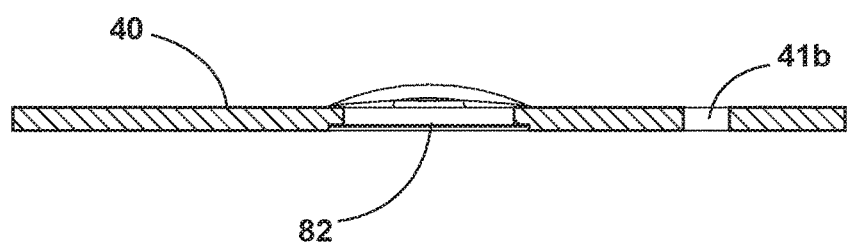
FIG. 15B is a sectional view generally illustrating embodiments of a crash washer associated with a hydraulic body mount, in accordance with teachings of the present disclosure.
Figure 15C:
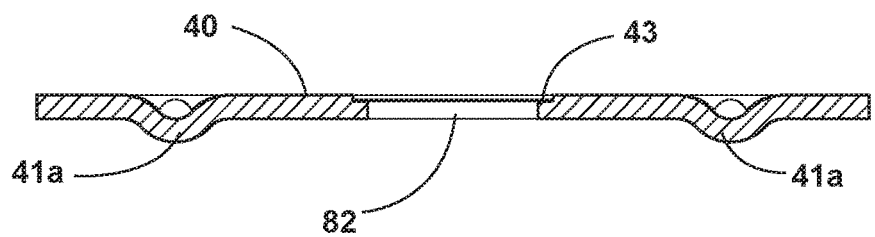
FIG. 15C is a sectional view generally illustrating embodiments of a crash washer associated with a hydraulic body mount, in accordance with teachings of the present disclosure.

FIG. 3A generally illustrates an embodiment of the hydraulic body mount 10. The inner shaft 12 and the plate 14 may be joined (e.g., welded), about shaft hole 70 and/or plate hole 76 forming inner subassembly 16 (as shown in FIGS. 4A-4C). Inner subassembly 16 and mounting bracket 18 may be joined (e.g., over molded with rubber), to form main rubber element (MRE) 20 (as shown in FIGS. 6A-6B). Fluid track 24 and/or upper bellows 26 may be configured on inner shaft 12 such that they may engage mounting bracket 18 and/or MRE 20. Lower bellows 30 may be placed on inner shaft 12 such that it may engage fluid track 24 and/or upper bellows 26. Outer can 32 may be configured with lower bushing 36 and may be placed on inner shaft 12 such that it may engage (e.g., seal), mounting bracket 18, MRE 20, fluid track 24 and/or lower bellows 30. Doubler plate 42 may engage mounting bracket 18 and/or outer can 32. Tabs 46 on outer can 32 and/or doubler plate 42 may be crimped (e.g., compressed), to secure doubler plate 42 to outer can 32 and/or mounting plate 18. Retainer bracket 44 may engage inner shaft 12 via the inner surface 70 of inner shaft 12. Retainer bracket 44 may also engage crash washer 40 via crash washer hole 82 (as shown in FIGS. 15A-15C) and/or a beveled edge 43 (as shown in FIG. 15C) to secure crash washer 40 to hydraulic engine mount 10. Stake bolts 38 may be secured to (e.g., driven into), mounting plate 18, outer can 32, and/or doubler plate 42 via mounting holes 52 and/or force-fit portion 60 (as shown in FIG. 3C). Fill port 50 may be configured in fluid track 24 and/or outer can 32.

Figure 3B:
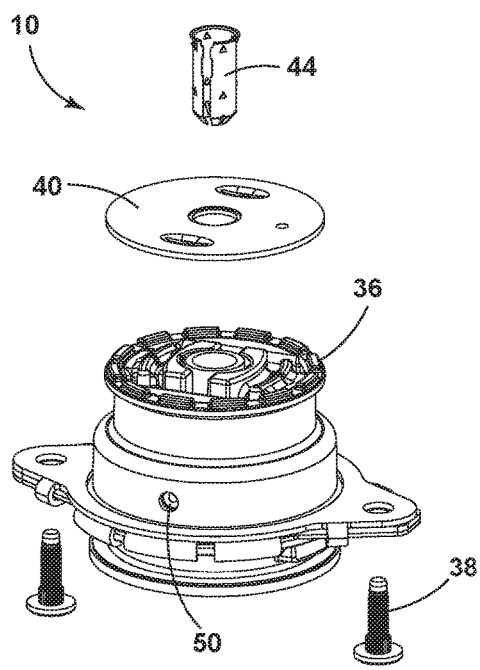
FIG. 3B is a partially exploded view generally illustrating an embodiment of a hydraulic body mount, in accordance with teachings of the present disclosure.
Figure 3C:
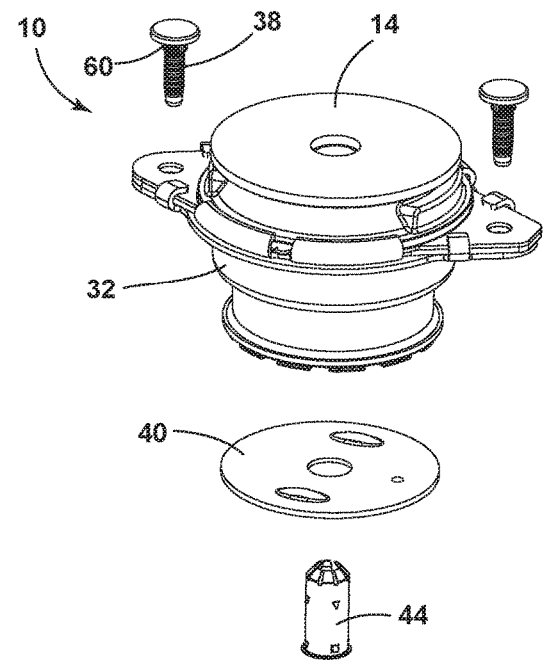
FIG. 3C is a partially exploded view generally illustrating an embodiment of a hydraulic body mount, in accordance with teachings of the present disclosure.
Figure 14A:
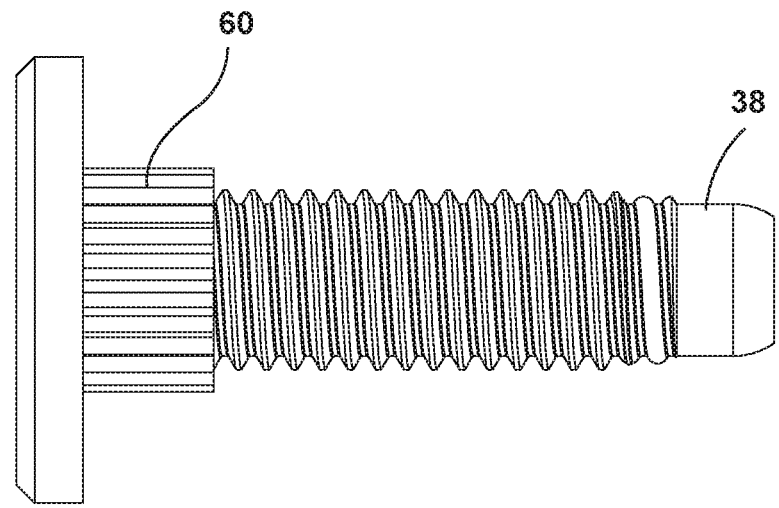
FIG. 14A is a perspective view generally illustrating embodiments of a stake bolt associated with a hydraulic body mount, in accordance with teachings of the present disclosure.

FIG. 3B generally illustrates an embodiment of the hydraulic body mount 10. Retainer bracket 44 may engage inner shaft 12 via the inner surface 70 of inner shaft 12 (as shown in FIG. 3A). Retainer bracket 44 may also engage crash washer 40 via crash washer hole 82 (as shown in FIGS. 15A-15C) and/or beveled edge 43 (as shown in FIG. 15C) to secure crash washer 40 to lower bushing 36 of hydraulic engine mount 10. Stake bolts 38 may be secured to (e.g., driven into), mounting plate 18, outer can 32, and/or doubler plate 42 via mounting holes 52 (as shown in FIG. 3A) and/or force-fit portion 60 of stake bolts 38 (as shown in FIGS. 3C and 14A).

FIG. 3C generally illustrates an embodiment of the hydraulic body mount 10. Retainer bracket may engage crash washer 40 via crash washer hole 82 (as shown in FIGS. 15A-15C) and/or beveled edge 43 (as shown in FIG. 15C) to secure crash washer 40 to outer can 32 via lower bushing 36 (as shown in FIG. 3B). Stake bolts 38 may be secured to (e.g., driven into), mounting plate 18 and outer can 32 via mounting holes 52 and/or force-fit portion 60 of stake bolts 38 (as shown in FIGS. 3C and 14A).

Figure 3D:
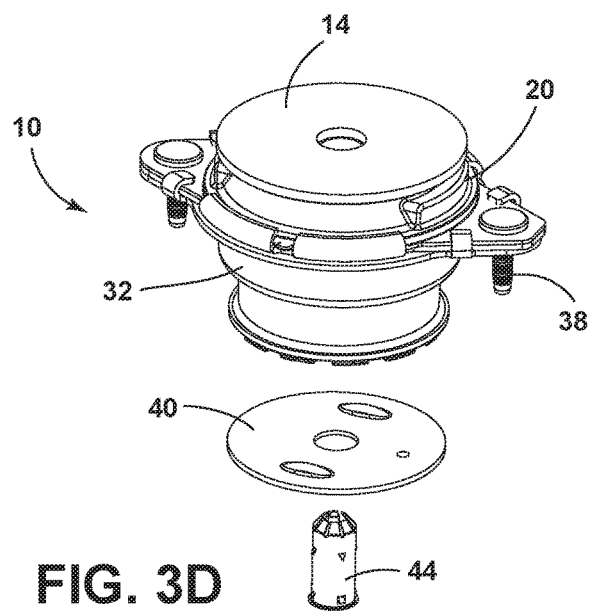
FIG. 3D is a partially exploded view generally illustrating an embodiment of a hydraulic body mount, in accordance with teachings of the present disclosure.

FIG. 3D generally illustrates an embodiment of the hydraulic body mount 10. Retainer bracket 44 may engage crash washer 40 via crash washer hole 82 (as shown in FIGS. 15A-15C) and/or beveled edge 43 (as shown in FIG. 15C) to secure crash washer 40 to outer can 32 via lower bushing 36 (as shown in FIG. 3B). Stake bolts 38 may be secured to (e.g., driven into), mounting plate 18 and outer can 32 via mounting holes 52 and/or force-fit portion 60 of stake bolts 38 (as shown in FIGS. 3C and 14A).

Figure 3E:
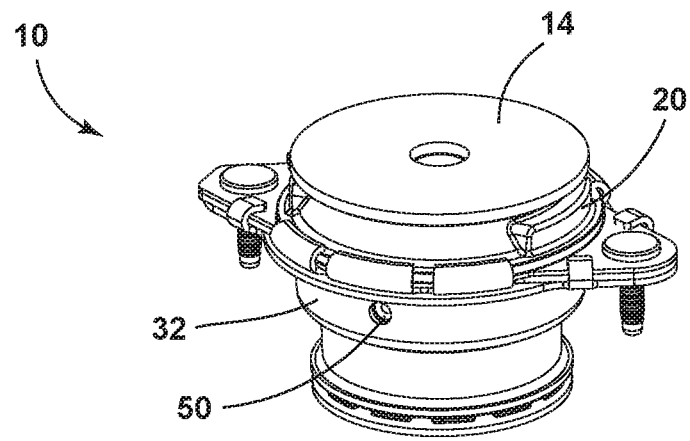
FIG. 3E is an assembled view generally illustrating an embodiment of a hydraulic body mount, in accordance with teachings of the present disclosure.

FIG. 3E generally illustrates an embodiment of the hydraulic body mount 10. The inner shaft 12 and the plate 14 may be joined (e.g., welded), about shaft hole 70 and/or plate hole 76 forming inner subassembly 16 (as shown in FIGS. 4A-4C). Inner subassembly 16 and mounting bracket 18 may be joined (e.g., over molded with rubber), to form main rubber element (MRE) 20 (as shown in FIGS. 6A-6B). Fill port 50 may be configured in fluid track 24 (as shown in FIG. 3A) and/or outer can 32. Hydraulic body mount 10 may be filled with a fluid (e.g., glycol), via fill port 50. For example, hydraulic body mount 10 may be positioned such that fill port 50 is oriented (i.e., pointed), upwards. In embodiments, fill port 50 may receive fluid and/or may permit air (or other gases) to escape. In embodiments, a vacuum (i.e., negative pressure), may be applied via fill port 50, to evacuate fluid track 24 prior to filling with a fluid.

Figure 3F:
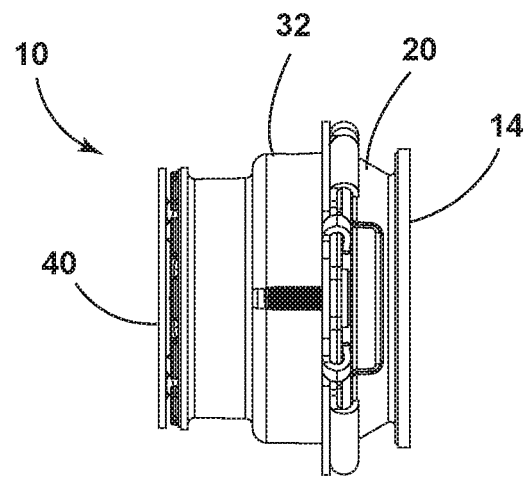
FIG. 3F is an assembled view generally illustrating an embodiment of a hydraulic body mount, in accordance with teachings of the present disclosure.

FIG. 3F generally illustrates an embodiment of the hydraulic body mount 10. The inner shaft 12 and the plate 14 may be joined (e.g., welded), about shaft hole 70 and/or plate hole 76 forming inner subassembly 16 (as shown in FIGS. 4A-4C). Inner subassembly 16 and mounting bracket 18 may be joined (e.g., over molded with rubber), to form MRE 20 (as shown in FIGS. 6A-6B). Outer can 32 may be configured with lower bushing 36 and may be placed on inner shaft 12 such that it may engage (e.g., seal), mounting bracket 18, MRE 20, fluid track 24 and/or lower bellows 30.

FIG. 4A generally illustrates an embodiment of the inner shaft 12 and/or the plate 14 associated with the hydraulic body mount 10. Inner shaft 12 may be constructed of metal (e.g., steel). Inner shaft 12 may be a hollow cylinder and/or may have a shoulder 78 that may be formed (e.g., cold formed), on at least one end of inner shaft 12. Inner shaft 12 may be configured such that the inner diameter of inner shaft 12 may generally align with (e.g., be approximately equal to), the diameter of plate hole 76 in plate 14. Plate 14 may be constructed of metal (e.g., steel). Plate hole 76 may be configured in the center of plate 14. Inner shaft 12 and plate 14 may be joined (e.g., projection welded, friction welded).

FIGS. 4B-4C generally illustrate an embodiment of the inner shaft 12 and/or the plate 14 associated with the hydraulic body mount 10. In embodiments, at least a portion of inner shaft 12 and/or plate 14 may be coated with a corrosion preventative C. In embodiments, at least a portion of inner shaft 12 and/or plate 14 may be coated with at least one of corrosion preventative C, a primer P and/or an adhesive A.

As described herein, at least some of the components of hydraulic body mount 10 may be coated (e.g., covered, treated, exposed), by one or more of the following: corrosion preventative C, primer P, and/or adhesive A. In embodiments, corrosion preventative C may be a zinc/nickel coating. In embodiments, primer P may be a coating that promotes the bonding of an adhesive A to a surface, such as, but not limited to, metal. In embodiments, adhesive A may be a coating that promotes the bonding of one component of hydraulic body mount 10 to one or more other components of hydraulic body mount 10. In embodiments, adhesive A may include sealing properties, such as, but not limited to, preventing the leakage of fluid contained within hydraulic body mount 10. It should also be understood that materials selected for one or more of the components of hydraulic body mount 10 may include some or all of the properties of the coatings (e.g., corrosion resistance, adhesive bonding properties). It should also be understood that while individual coatings are described for each of corrosion preventative C, primer P, and adhesive A, a combination of two or more coatings each for C, P, and A is also disclosed.

Figure 5A:
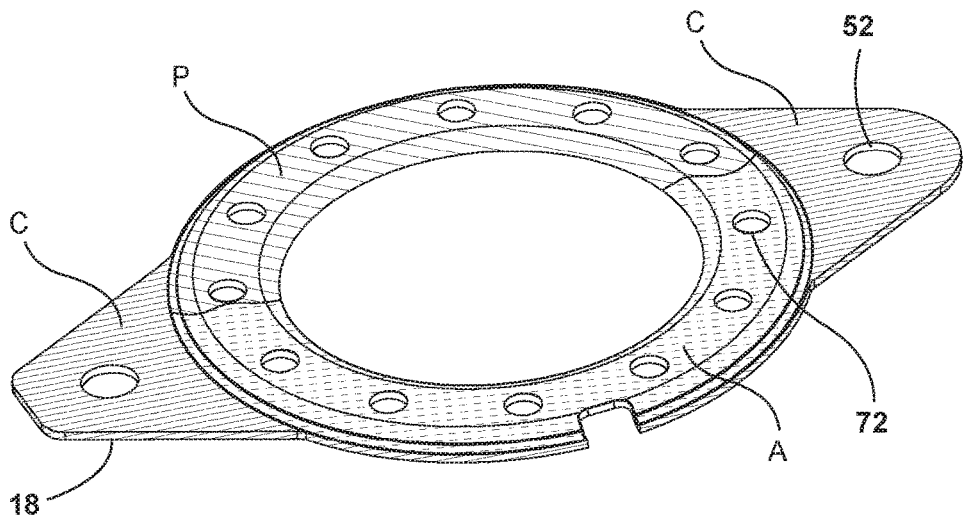
FIG. 5A is a top perspective view generally illustrating embodiments of a mounting bracket associated with a hydraulic body mount, in accordance with teachings of the present disclosure.
Figure 5B:
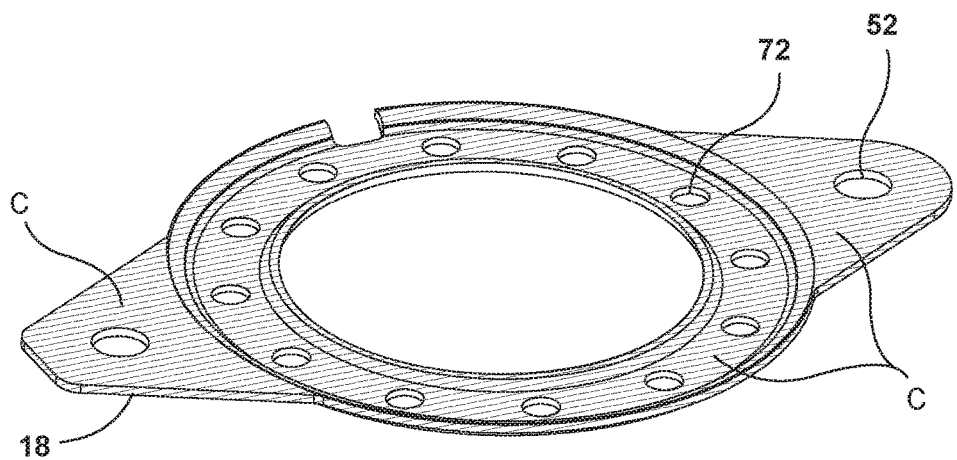
FIG. 5B is a bottom perspective view generally illustrating embodiments of a mounting bracket associated with a hydraulic body mount, in accordance with teachings of the present disclosure.

FIGS. 5A-5B generally illustrate an embodiment of the mounting bracket 18 associated with the hydraulic body mount 10. Mounting bracket 18 may include one or more mounting holes 52 and/or one or more flow holes 72. Flow holes 72 of mounting bracket 18 may be configured to permit the flow of rubber in the formation of MRE 20 about inner subassembly 16 and mounting bracket 18 (as shown in FIGS. 6A-6B). In embodiments, at least a portion of mounting bracket 18 may be coated with at least one of corrosion preventative C, primer P and/or adhesive A. In embodiments, at least a portion of mounting bracket 18 may be coated with a corrosion preventative C.

FIGS. 6A-6B generally illustrate an embodiment of the inner shaft 12, the plate 14, the inner subassembly 16, the mounting bracket 18, and/or the main rubber element (MRE) 20 associated with the hydraulic body mount 10. MRE 20 may be constructed (e.g., formed), of a flexible and/or moldable material (e.g., rubber). MRE 20 may be joined by forming MRE 20 about at least a portion of mounting bracket 18 and/or inner subassembly 16 (including inner shaft 12 and plate 14) via rubber. MRE 20 may be joined to mounting bracket 18 such that flow holes 72 may permit rubber to flow through and/or secure (e.g., integrate), mounting bracket 18 to MRE 20.

Figure 7A:
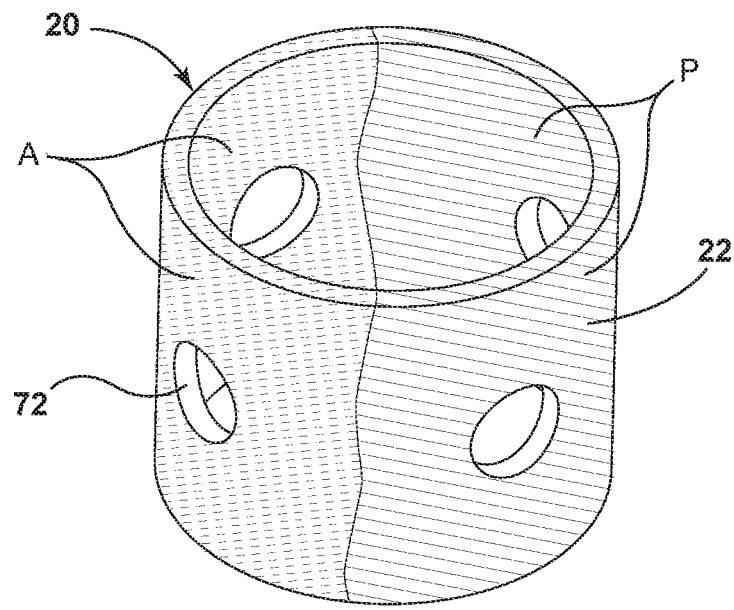
FIG. 7A is a perspective view generally illustrating embodiments of an inner ring associated with a hydraulic body mount, in accordance with teachings of the present disclosure.
Figure 7B:
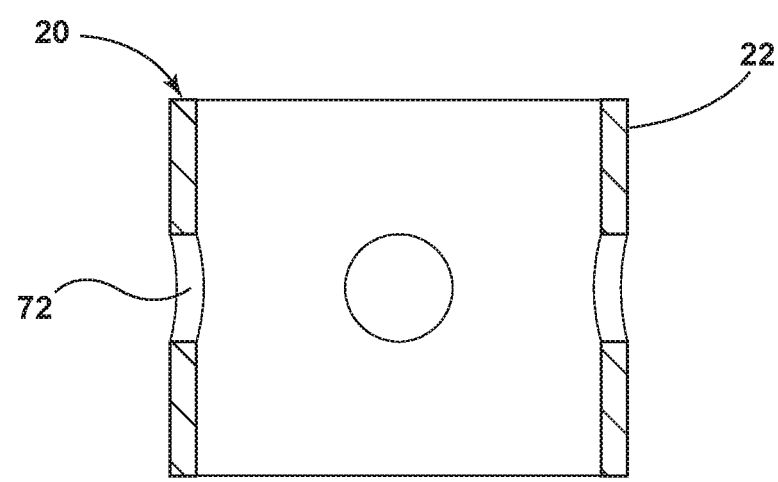
FIG. 7B is a sectional view generally illustrating embodiments of an inner ring associated with a hydraulic body mount, in accordance with teachings of the present disclosure.

FIGS. 7A-7B generally illustrate an embodiment of the inner ring 22 associated with the hydraulic body mount 10. In embodiments, inner ring 22 may be comprised of metal (e.g., steel). In embodiments, inner ring 22 may be configured in a cylindrical form. In embodiments, inner ring 22 may include one or more flow holes 72 that may be configured to enhance the encapsulation (e.g., overmolding), of inner ring 22 by rubber and/or other suitable flexible material. In embodiments, inner ring 22 may be coated with at least primer P and/or adhesive A.

Figure 8A:
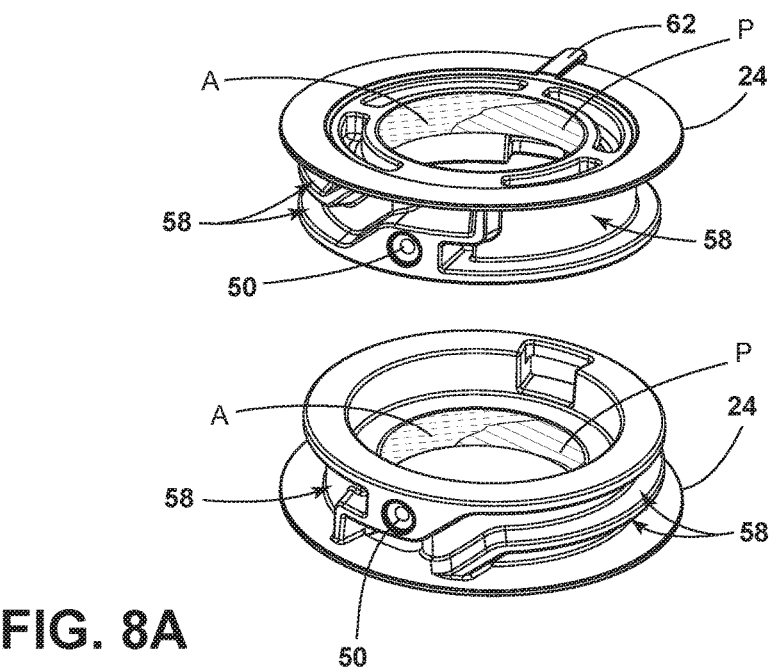
FIG. 8A is a perspective and/or sectional views generally illustrating embodiments of an upper bellows and/or fluid track associated with a hydraulic body mount, in accordance with teachings of the present disclosure.

FIG. 8A generally illustrates an embodiment of the fluid track 24 that may be associated with the hydraulic body mount 10. In embodiments, fluid track 24 may be constructed of metal (e.g., aluminum). In embodiments, fluid track 24 may include one or more fluid passages 58. Fluid (e.g., glycol), may flow (e.g., circulate), and/or be contained in one or more fluid passages 58 of fluid track 24. The length of fluid passages 58 may be configured to adjust the dampening aspects of hydraulic body mount 10. For example and without limitation, a shorter fluid passage 58 may result in less dampening, whereas a longer fluid passage 58 may result in more dampening. Additionally and alternatively, a shorter fluid passage 58 may result in more dampening, whereas a longer fluid passage 58 may result in less dampening. In embodiments, the physical characteristics (e.g., size, shape, cross-section, and/or profile), of fluid passages 58 may be adjusted to modify the dampening characteristics of hydraulic body mount 10. In embodiments, fluid track 24 may include one or more fill ports 50. In embodiments, fluid (e.g., glycol), may enter (e.g., be injected into), fluid track 24 via fill port 50. Fill port 50 of fluid track 24 may be configured to align with fill port 50 of outer can 32. Fill port 50 may be sealed (e.g., capped), by a plug (e.g., ball bearing, not shown). Fluid track 24 may include a locator 62 that may permit fill port 50 of fluid track 24 to be oriented to align with fill port 50 of outer can 32 during assembly of hydraulic body mount 10. In embodiments, at least a portion of fluid track 24 may be coated with primer P and/or adhesive A.

Figures 8B, 8C:
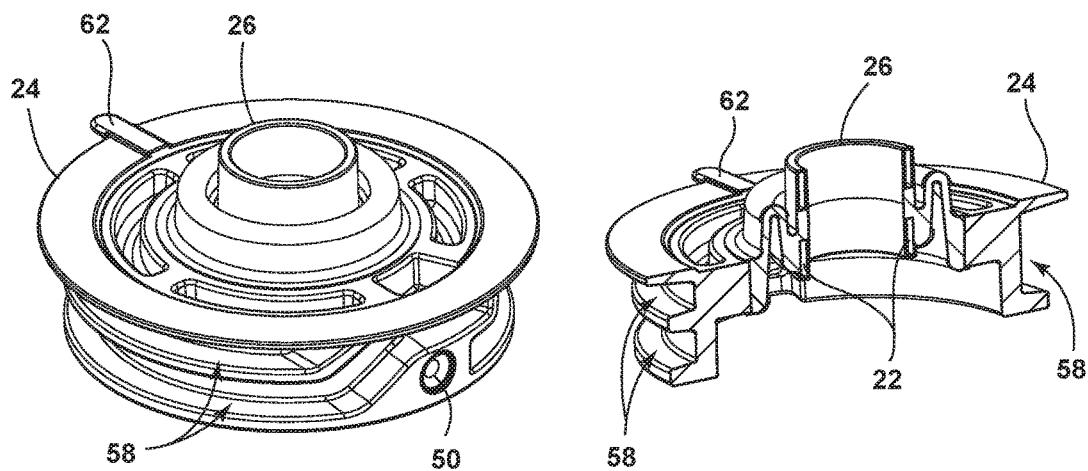
FIG. 8B is a perspective view generally illustrating embodiments of an upper bellows and/or fluid track associated with a hydraulic body mount, in accordance with teachings of the present disclosure.
FIG. 8C is a sectional view generally illustrating embodiments of an upper bellows and/or fluid track associated with a hydraulic body mount, in accordance with teachings of the present disclosure.

FIG. 8B generally illustrates an embodiment of the upper bellows 26 that may be associated with the hydraulic body mount 10. In embodiments, upper bellows 26 may be comprised of a moldable and/or flexible material (e.g., rubber). In embodiments, upper bellows 26 be may be molded over inner ring 22 such that inner ring 22 is encapsulated within upper bellows 26 (as shown in FIG. 8C). In embodiments, inner ring 22 may be configured to reinforce (e.g., strengthen), upper bellows 26, such as, but not limited to, with respect to inner shaft 12. Upper bellows 26 may adhere (e.g., bond), to fluid track 24 via adhesive A applied over primer P (as shown in FIG. 8A).

FIG. 8C generally illustrates an embodiment of the fluid track 24 and/or the upper bellows 26 that may be associated with the hydraulic body mount 10. In embodiments, upper bellows 26 be may be molded over inner ring 22 such that inner ring 22 is encapsulated at least partially within upper bellows 26.

Figure 8D:
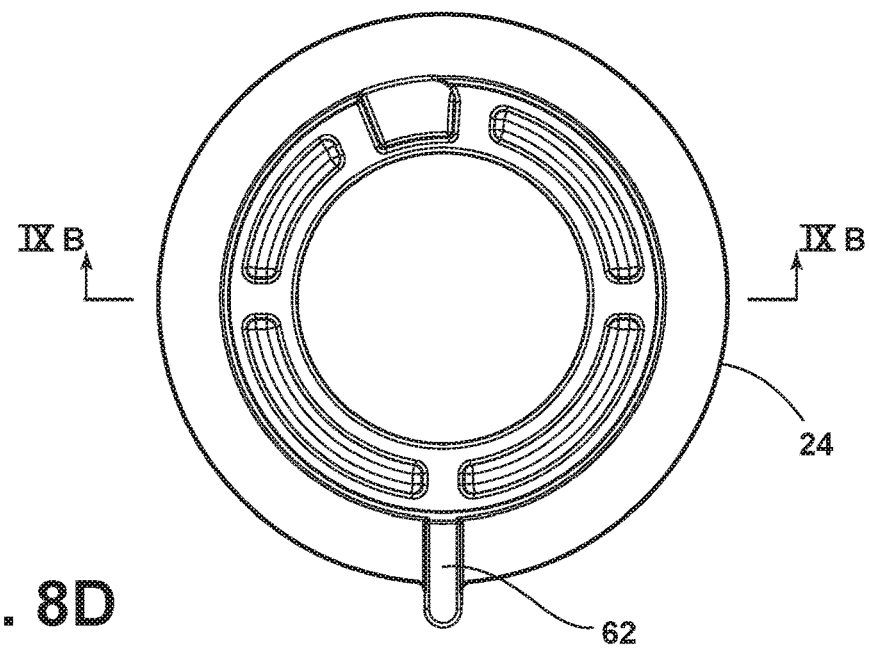
FIG. 8D is a top view generally illustrating embodiments of an upper bellows and/or fluid track associated with a hydraulic body mount, in accordance with teachings of the present disclosure.
Figure 8E:
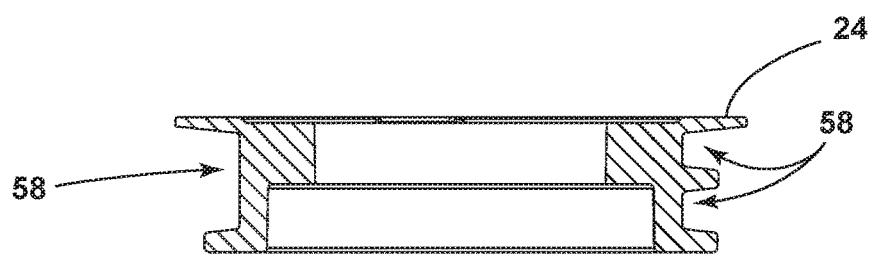
FIG. 8E is a sectional view generally illustrating embodiments of an upper bellows and/or fluid track associated with a hydraulic body mount, in accordance with teachings of the present disclosure.
Figure 8F:
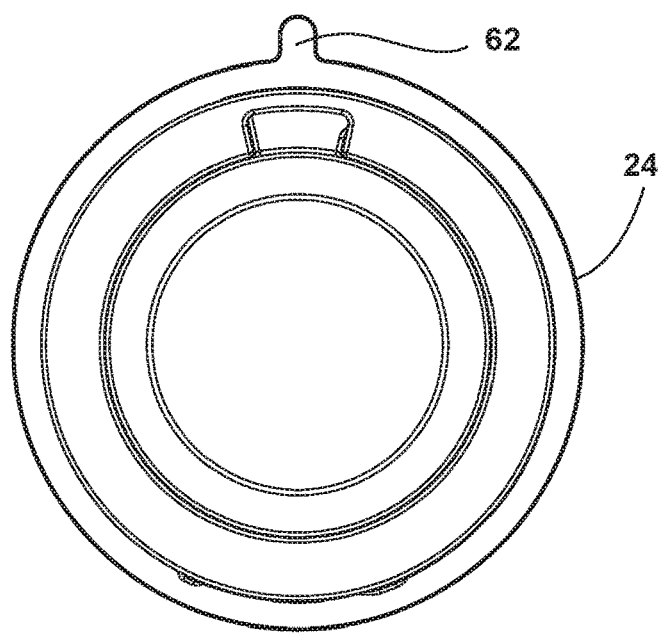
FIG. 8F is a bottom view generally illustrating embodiments of an upper bellows and/or fluid track associated with a hydraulic body mount, in accordance with teachings of the present disclosure.

FIGS. 8D-8F generally illustrate an embodiment of the fluid track 24 that may be associated with the hydraulic body mount 10. Fluid track 24 may include at least one locator 62 that may permit fill port 50 of fluid track 24 to be oriented to align with fill port 50 of outer can 32, such as, but not limited to, during assembly of hydraulic body mount 10. It should be understood that locator 62 may be of a variety of shapes, including additive shapes (e.g., tabs), and/or subtractive shapes (e.g., notches), that may be configured to engage at least one other surface, such as the surface of a manufacturing device (e.g., jig).

In embodiments, fluid track 24 may include one or more fluid passages 58. Fluid (e.g., glycol), may flow (e.g., circulate), and/or be contained in one or more fluid passages 58 of fluid track 24. The length of fluid passages 58 may be configured to adjust the dampening aspects of hydraulic body mount 10. For example and without limitation, a shorter fluid passage 58 may result in less dampening, whereas a longer fluid passage 58 may result in more dampening. Additionally and alternatively, a shorter fluid passage 58 may result in more dampening, whereas a longer fluid passage 58 may result in less dampening. In embodiments, the physical characteristics (e.g., size, shape, cross-section, and/or profile), of fluid passages 58 may be adjusted to modify the dampening characteristics of hydraulic body mount 10.

Figure 9:
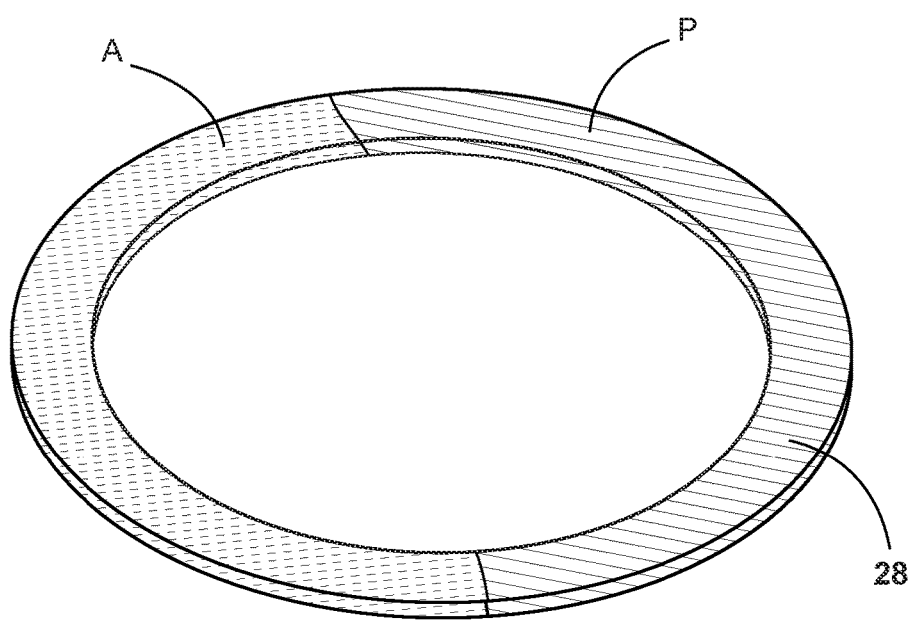
FIG. 9 is a perspective view generally illustrating an embodiment of a lower bellows washer associated with a hydraulic body mount, in accordance with teachings of the present disclosure.

FIG. 9 generally illustrates an embodiment of the washer 28 that may be associated with the hydraulic body mount 10. In embodiments, washer 28 may be constructed of metal (e.g., steel). In embodiments, washer 28 may be configured to reinforce (e.g., strengthen), lower bellows 30, such as, but not limited to, with respect to outer can 32. Washer 28 may be encapsulated within lower bellows 30 (as shown in FIG. 10B). In embodiments, at least a portion of washer 28 may be coated with primer P and/or adhesive A.

Figure 10A:
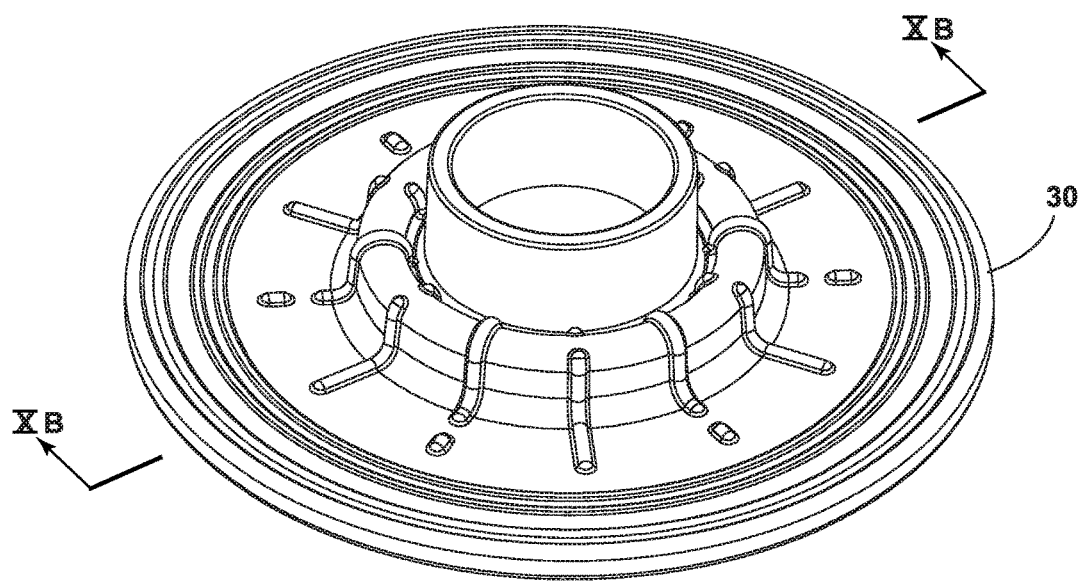
FIG. 10A is a perspective view generally illustrating embodiments of a lower bellows associated with a hydraulic body mount, in accordance with teachings of the present disclosure.
Figure 10B:
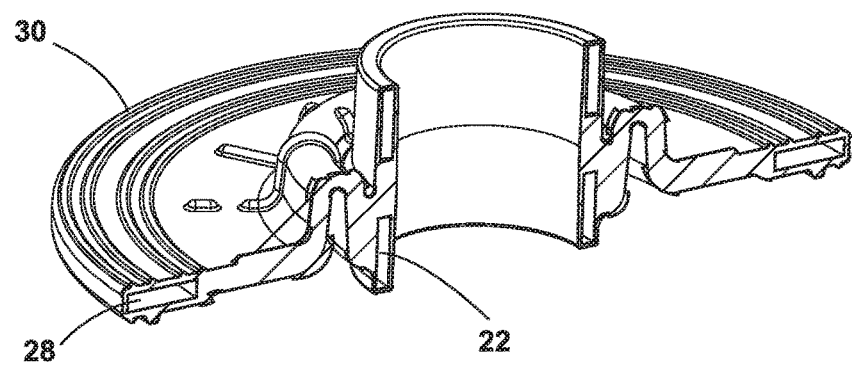
FIG. 10B is a sectional views generally illustrating embodiments of a lower bellows associated with a hydraulic body mount, in accordance with teachings of the present disclosure.

FIGS. 10A-10B generally illustrate an embodiment of the lower bellows 30 that may be associated with the hydraulic body mount 10. Lower bellows 30 may be constructed of a moldable and/or flexible material (e.g., rubber). Lower bellows may be configured to engage inner subassembly 16 (as shown in FIGS. 2A-2B). Lower bellows 30 be may be configured to include an inner ring 22 and/or a washer 28 such that inner ring 22 and/or washer 28 may be encapsulated (e.g., over molded), with rubber within lower bellows 30. Lower bellows may be configured to engage inner subassembly 16, including inner ring 22 (as shown in FIGS. 2A-2B).

Figure 11A:
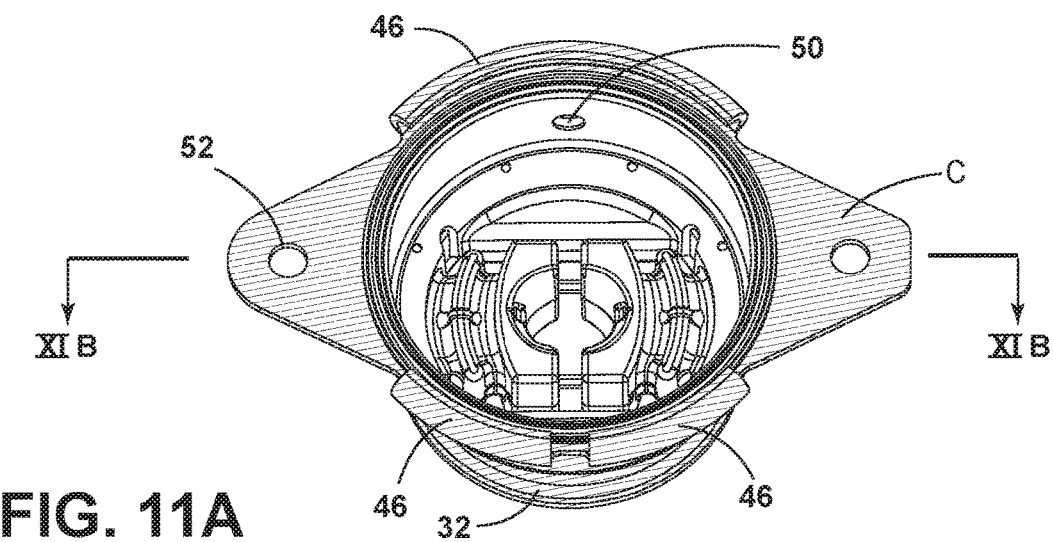
FIG. 11A is a top perspective view generally illustrating embodiments of an outer can associated with a hydraulic body mount, in accordance with teachings of the present disclosure.
Figure 11B:
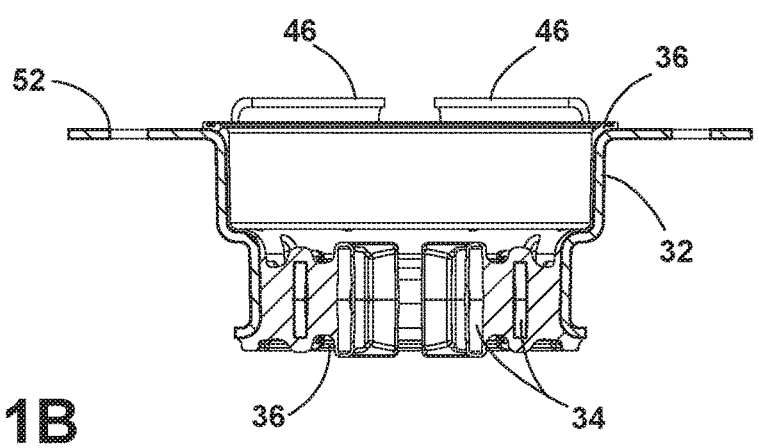
FIG. 11B is a sectional view generally illustrating embodiments of an outer can associated with a hydraulic body mount, in accordance with teachings of the present disclosure.
Figure 11C:
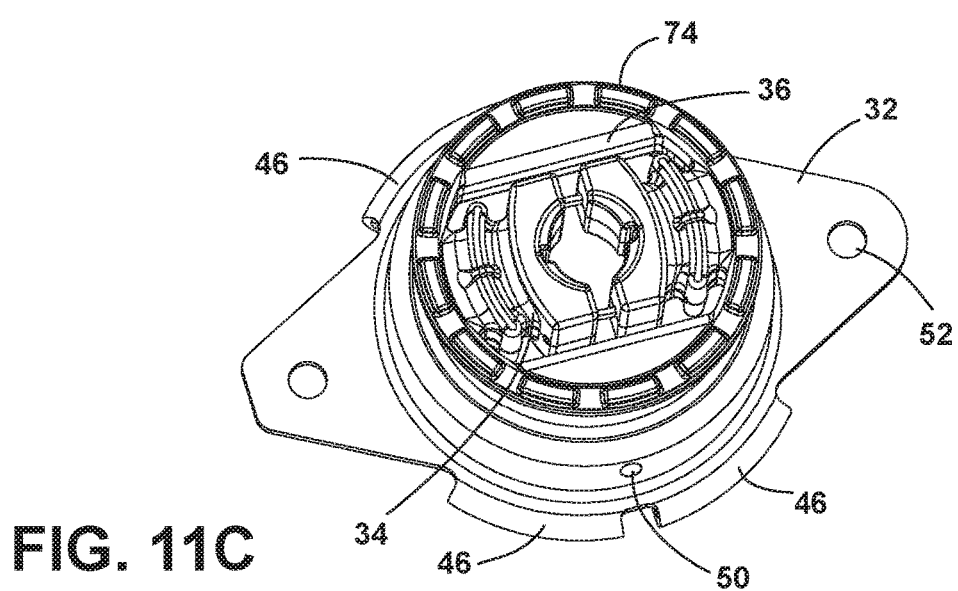
FIG. 11C is a bottom perspective view generally illustrating embodiments of an outer can associated with a hydraulic body mount, in accordance with teachings of the present disclosure.

FIGS. 11A-11C generally illustrate an embodiment of the outer can 32 and/or the lower bushing 36 that may be associated with the hydraulic body mount 10. In embodiments, outer can 32 may be constructed of metal (e.g., steel). In embodiments, outer can 32 may include tabs 46, fill port 50, and/or holes 52. In embodiments, at least a portion of outer can 32 may be coated with at least one of corrosion preventative C, primer P and/or adhesive A. Tabs 46 may be configured to engage mounting bracket 18 and/or a doubler plate 42. For example and without limitation, tabs 46 may be crimped (e.g., compressed), to capture and/or secure outer can 32 to mounting bracket 18 and/or double plate 42. Outer can 32 may include rate plate 34 and/or lower bushing 36. In embodiments, outer can 32 and/or rate plate 34 may be placed in a mold (not shown) after which a flexible material (e.g., rubber), may be injected into at least a portion of outer can 32, encapsulating at least a portion of rate plate 34 and forming lower bushing 36 within outer can 32, as discussed in more detail below. In embodiments, lower bushing 36 may include one or more snubbers 74.

Figure 12A:
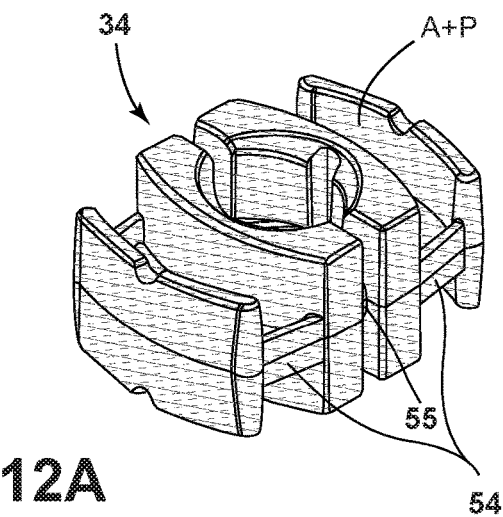
FIG. 12A is a perspective view generally illustrating embodiments of an inner/rate plate associated with a hydraulic body mount, in accordance with teachings of the present disclosure.
Figure 12B:
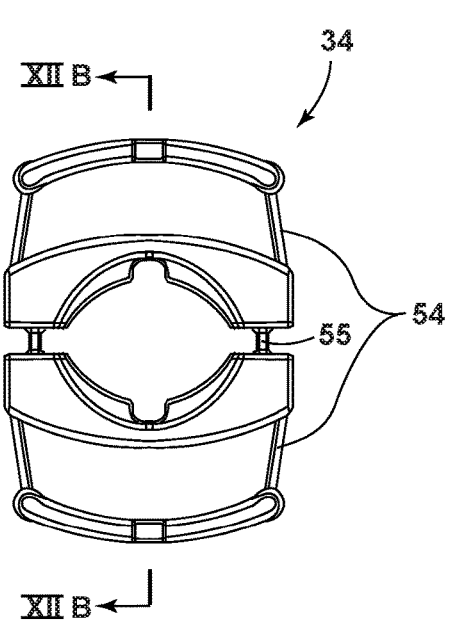
FIG. 12B is a top perspective view generally illustrating embodiments of an inner/rate plate associated with a hydraulic body mount, in accordance with teachings of the present disclosure.
Figure 12C:
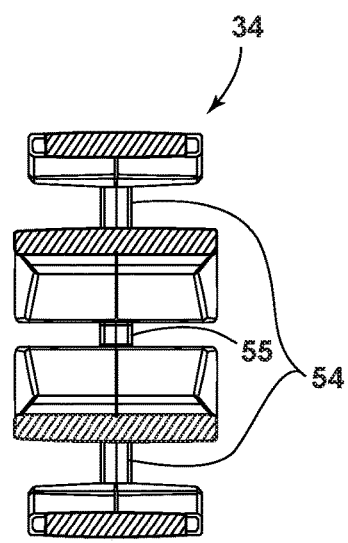
FIG. 12C is a sectional view generally illustrating embodiments of an inner/rate plate associated with a hydraulic body mount, in accordance with teachings of the present disclosure.
Figure 12D:
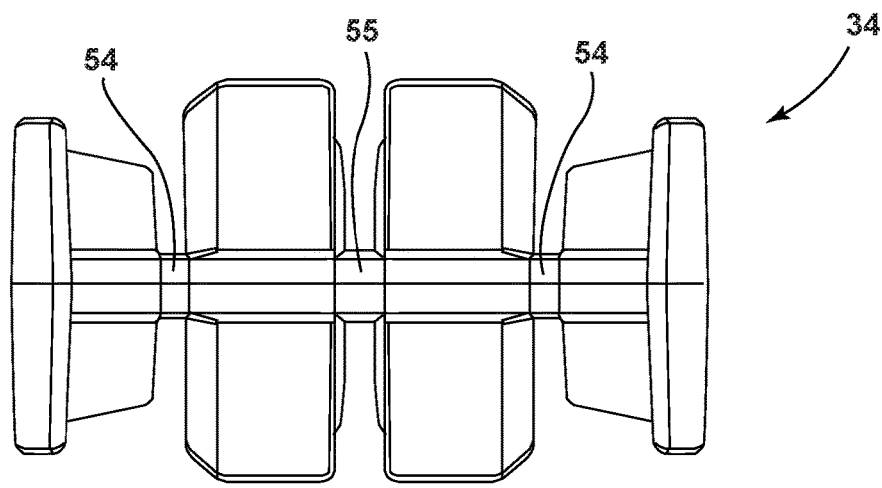
FIG. 12D is a side perspective view generally illustrating embodiments of an inner/rate plate associated with a hydraulic body mount, in accordance with teachings of the present disclosure.
Figure 12E:
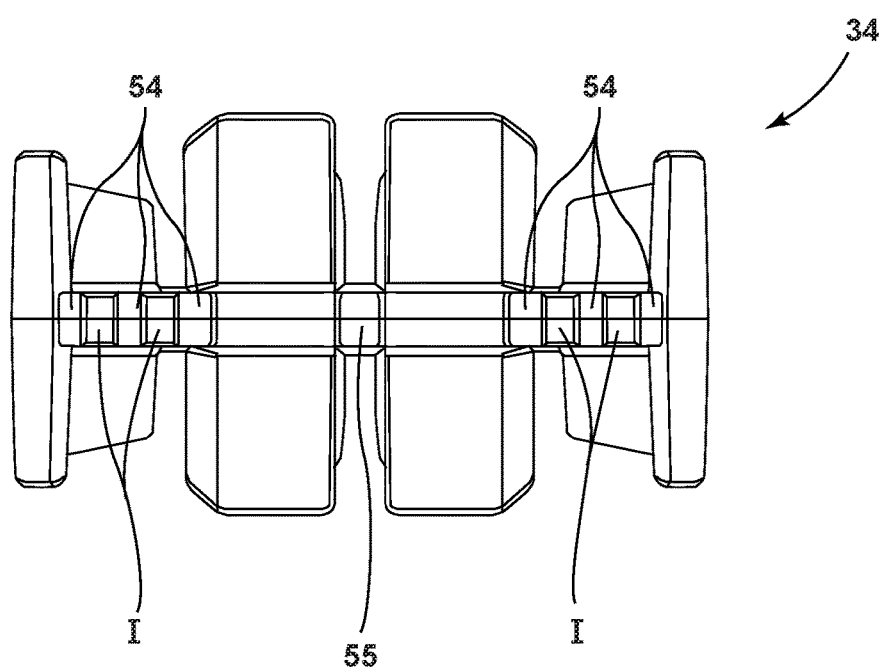
FIG. 12E is a perspective view generally illustrating embodiments of an inner/rate plate associated with a hydraulic body mount, in accordance with teachings of the present disclosure.
Figures 13A, 13B:
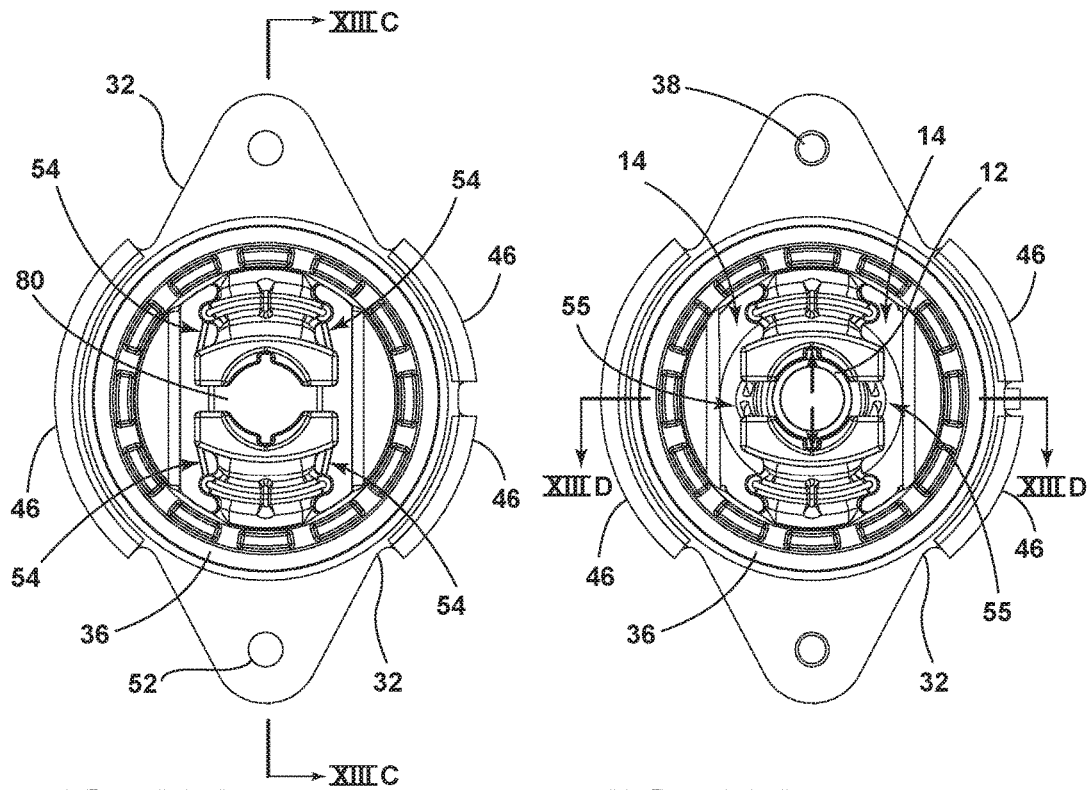
FIG. 13A is a top perspective view generally illustrating embodiments of a lower bushing associated with a hydraulic body mount, in accordance with teachings of the present disclosure.
FIG. 13B is a bottom perspective view generally illustrating embodiments of a lower bushing associated with a hydraulic body mount, in accordance with teachings of the present disclosure.

FIGS. 12A-12E generally illustrate embodiments of the rate plate 34 that may be associated with the hydraulic body mount 10. In embodiments, rate plate 34 may be positioned to engage inner shaft 12 (as shown in FIGS. 2A-2B, 13B). Rate plate 34 may be constructed of a moldable material (e.g., plastic, polymer, composite). Rate plate 34 may include outboard frangible (e.g., deformable, breakable), sections 54 and inboard frangible sections 55. It should be understood that the terms "frangible", "deformable", and "breakable" are used herein interchangeably. At least a portion of rate plate 34 may be coated with primer P and/or adhesive A (as shown in FIG. 12A). In embodiments, outboard frangible sections 54 and/or inboard frangible sections 55 may be positioned (e.g., situated), between and/or in proximity to elements of rate plate 34, such that outboard frangible sections 54 and/or inboard frangible sections 55 may connect (e.g., join), elements of rate plate 34 to one another. In embodiments, outboard frangible sections 54 may be configured to join one or more elements of rate plate 34 to at least one other element of rate plate 34. In embodiments, inboard frangible section(s) 55 may be configured to join one or more elements of rate plate 34 to at least one other element of rate plate 34. While outboard frangible sections 54 and/or inboard frangible sections 55 are shown situated along an axis of rate plate 34, it should be understood that this configuration is only exemplary and not limiting. Other configurations of outboard frangible sections 54 and/or inboard frangible sections 55 joining elements of rate plate 34 may be configured. In embodiments, rate plate 34 may receive indentations I (as shown in FIG. 12E), on some or all of outboard frangible sections 54 and/or inboard frangible sections 55 as a result of a forming operation, installing lower bushing 36 and rate plate 34 within outer can 32. In embodiments, rate plate 34 may be placed within outer can 32 and secured in position using a die, other positioning tool or portion thereof. In embodiments, rubber, or other suitable material, may be injected (e.g., inserted under pressure), into and/or around outer can 32 or a portion thereof, forming lower bushing 36 and encapsulating (e.g., trapping), at least a portion of rate plate 34 within lower bushing 36 of outer can 32. Outboard frangible sections 54 and/or inboard frangible sections 55 may be at least partially exposed (i.e., not encapsulated).

In embodiments, some or all of outboard frangible sections 54 and inboard frangible sections 55 may be broken away, such as, but not limited to, when inner subassembly 16 is inserted through lower bushing 36 (as shown in FIGS. 2A-2B, 13B). Some or all of outboard frangible sections 54 and/or inboard frangible sections 55 may be broken away (i.e., punched out), such as by an operator and/or other equipment during assembly. In embodiments, at least some inboard frangible sections 55 may remain at least partially attached to rate plate 34 after insertion of inner shaft 12 into lower bushing 36 and rate plate 34.

FIG. 13A generally illustrates an embodiment of inner shaft 12, outer can 32, a lower bushing 36, and/or rate plate 34 associated with the hydraulic body mount 10. As generally illustrated in FIGS. 11A-11C and 13A-13B, lower bushing 36 may be configured (e.g., molded), within outer can 32. As detailed above, rate plate 34 may be at least partially encased (e.g., over molded), within lower bushing 36. Frangible sections 54 of rate plate 34 may be configured such that they may be exposed (i.e., not encased), by lower bushing 36.

FIG. 13B generally illustrate an embodiment of inner shaft 12, outer can 32, lower bushing 36, and/or rate plate 34 associated with the hydraulic body mount 10. Inner shaft 12 may be inserted (e.g., forced), into lower bushing 36 via an opening 80. At least a portion of lower bushing 36 may compress due to the size disparity between opening 80 and/or inner subassembly 16. In embodiments, outboard frangible sections 54 and/or inboard frangible sections 55 of rate plate 34 may break, at least partially, due to the insertion of inner subassembly 16 into opening 80 and the compression of at least a portion of lower bushing 36. The compression of lower bushing 36 via inner shaft 12 may alter the properties of lower bushing 36. For example and without limitation, the compressed portions of lower bushing 36 may permit a higher level of resistance than non-compressed portions of lower bushing 36.

Figures 13C, 13D:
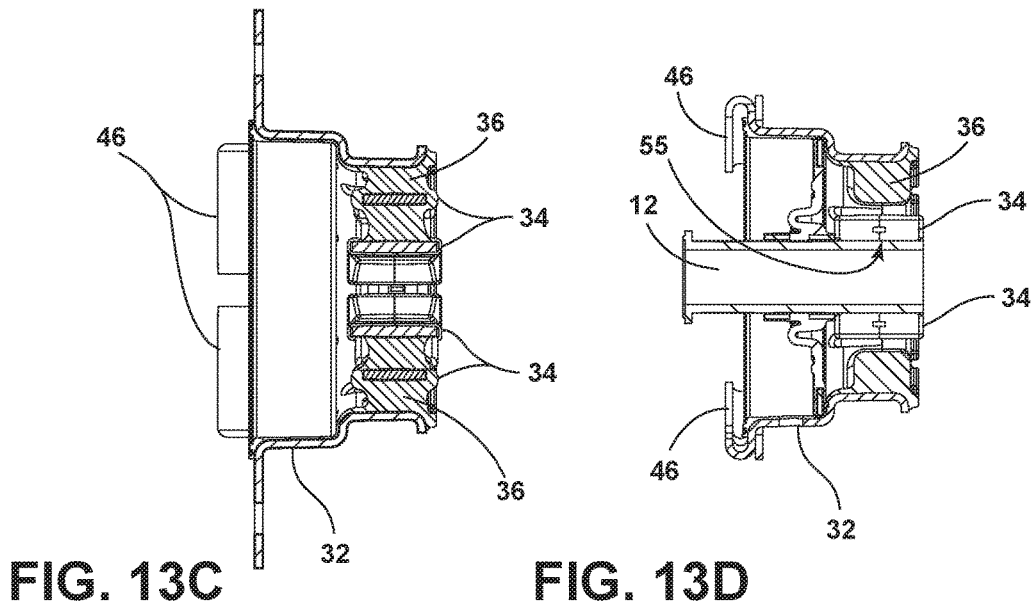
FIG. 13C is a sectional view generally illustrating embodiments of a lower bushing associated with a hydraulic body mount, in accordance with teachings of the present disclosure.
FIG. 13D is a sectional view generally illustrating embodiments of a lower bushing associated with a hydraulic body mount, in accordance with teachings of the present disclosure.

FIG. 13C generally illustrates an embodiment of inner shaft 12, outer can 32, a lower bushing 36, and/or rate plate 34 associated with the hydraulic body mount 10. As generally illustrated in FIGS. 11A-11C and 13A-13B, lower bushing 36 may be configured (e.g., molded), within outer can 32. As detailed above, rate plate 34 may be at least partially encased (e.g., over molded), within lower bushing 36. Frangible sections 54 of rate plate 34 may be configured such that they may be exposed (i.e., not encased), by lower bushing 36. As generally illustrated in FIG. 13B, inner shaft 12 may be inserted (e.g., forced), into lower bushing 36 via an opening 80. At least a portion of lower bushing 36 may compress due to the size disparity between opening 80 and/or inner subassembly 16. In embodiments, outboard frangible sections 54 and/or inboard frangible sections 55 of rate plate 34 may break, at least partially, due to the insertion of inner subassembly 16 into opening 80 and the compression of at least a portion of lower bushing 36. The compression of lower bushing 36 via inner shaft 12 may alter the properties of lower bushing 36. For example and without limitation, the compressed portions of lower bushing 36 may permit a higher level of resistance than non-compressed portions of lower bushing 36.

FIG. 13D generally illustrates an embodiment of inner shaft 12, outer can 32, the lower bushing 36, and/or rate plate 34 that may be associated with the hydraulic body mount 10. As generally illustrated in FIGS. 11A-11C and 13A-13B, lower bushing 36 may be configured (e.g., molded), within outer can 32. As detailed above, rate plate 34 may be at least partially encased (e.g., over molded), within lower bushing 36. Frangible sections 54 of rate plate 34 may be configured such that they may be exposed (i.e., not encased), by lower bushing 36. As generally illustrated in FIG. 13B, inner shaft 12 may be inserted (e.g., forced), into lower bushing 36 via an opening 80. At least a portion of lower bushing 36 may compress due to the size disparity between opening 80 and/or inner subassembly 16. In embodiments, outboard frangible sections 54 and/or inboard frangible sections 55 of rate plate 34 may break, at least partially, due to the insertion of inner subassembly 16 into opening 80 and the compression of at least a portion of lower bushing 36. The compression of lower bushing 36 via inner shaft 12 may alter the properties of lower bushing 36. For example and without limitation, the compressed portions of lower bushing 36 may permit a higher level of resistance than non-compressed portions of lower bushing 36.

Figure 14B:
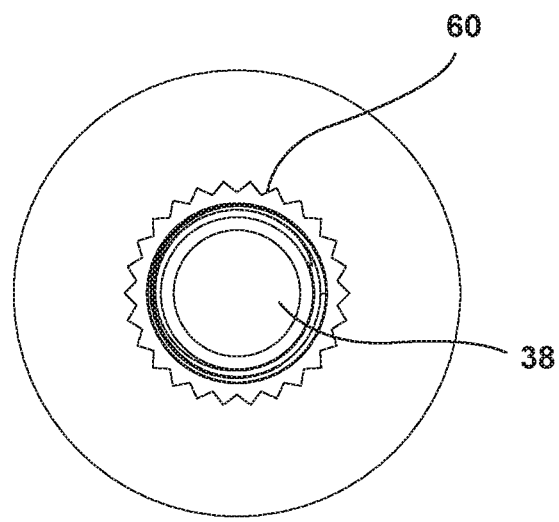
FIG. 14B is a perspective view generally illustrating embodiments of a stake bolt associated with a hydraulic body mount, in accordance with teachings of the present disclosure.

FIGS. 14A-14B generally illustrate embodiments of stake bolt 38 that may be associated with the hydraulic body mount 10. Stake bolt 38 may be constructed of metal (e.g., steel). Stake bolt 38 may be configured with a force-fit portion 60 such that stake bolt 38 may be driven (e.g., forced), through holes 52 of mounting bracket 18, outer can 32, and/or doubler plate 42. Stake bolt 38 may be joined to hydraulic body mount 10 via the deformation of the holes 52 of mounting bracket 18, outer can 32, and/or doubler plate 42 and/or force-fit portion 60 of stake bolt 38.

FIGS. 15A-15C generally illustrate embodiments of crash washer 40 that may be associated with the hydraulic body mount 10. In embodiments, crash washer 40 may be constructed of metal (e.g., steel). In embodiments, crash washer 40 may be configured generally circular with crash washer hole 82 at the center of crash washer 40. Crash washer 40 may be configured to be attached to inner shaft 12 of hydraulic body mount 10 via retainer bracket 44. Crash washer 40 may engage outer can 32 and/or one or more snubbers 74 (as shown in FIG. 2A) of hydraulic body mount 10. In embodiments, crash washer 40 may be coated with a corrosion preventative C. In embodiments, crash washer 40 may include one or more dimples 41a. (It should be understood that dimples 41a may be configured in a plurality of shapes and/or contours and the use of the term dimples is merely exemplary and not limiting.) Dimples 41a may be configured to aid in assembly of hydraulic body mount 10. For example, dimples 41a may be configured to indicate to an operator and/or robot (e.g., manufacturing device), which side of crash washer 40 includes beveled edge 43 for receiving retainer bracket 44. In embodiments, dimples 41a may be configured such that the concave side of the dimples 41a is on the same side as beveled edge 43. This configuration may enable an operator and/or robot to quickly position crash washer 40 correctly relative to lower bushing 36 and/or inner shaft 12. In embodiments, dimples 41a may be configured to engage portions of lower bushing 36 on either side of rate plate 34 (as shown in FIGS. 3A-3B). In embodiments, crash washer 40 may include a locator hole 41b. Locator hole 41b may be configured as an additional and/or supplemental assembly locating device. This configuration will enable an operator and/or robot to quickly position crash washer 40 correctly relative to lower bushing 36 and inner shaft 12.

Figure 16:
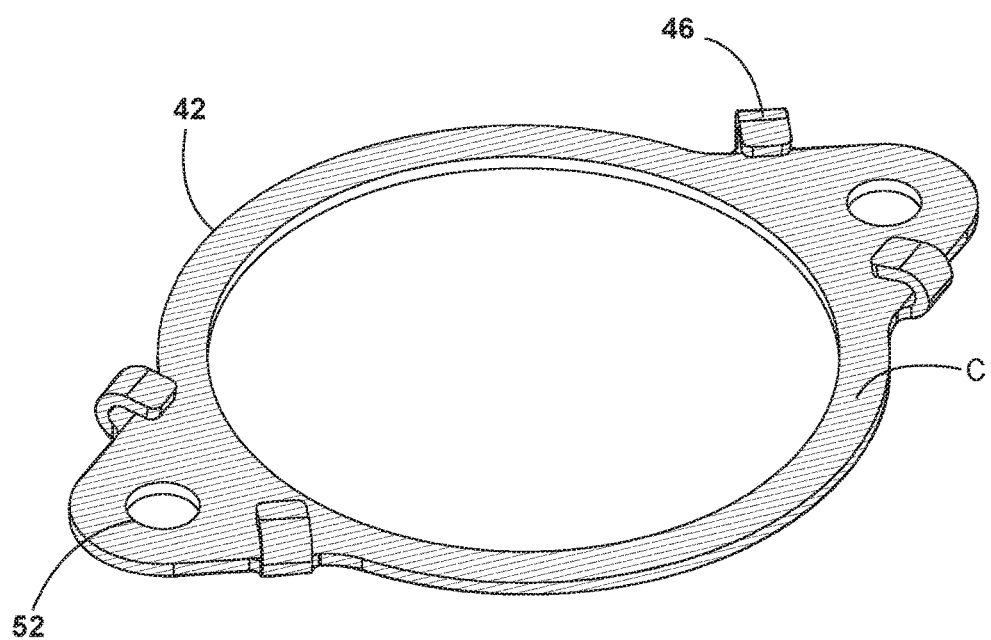
FIG. 16 is a perspective view generally illustrating an embodiment of a doubler plate associated with a hydraulic body mount, in accordance with teachings of the present disclosure.

FIG. 16 generally illustrates an embodiment of doubler plate 42 that may be associated with the hydraulic body mount 10. Doubler plate 42 may be constructed of metal (e.g., steel). Doubler plate 42 may include tabs 46 and/or holes 52. Tabs 46 of doubler plate 42 may be flexible (e.g., crimpable). Tabs 46 may be crimped (e.g., crushed, deformed), to secure doubler plate 42 to mounting bracket 18 and/or outer can 32. Doubler plate 42 may be configured to engage outer can 32 (as shown in FIGS. 1A-1B). In embodiments, one or more holes 52 of doubler plate 42 may be configured to engage stake bolts 38 (as shown in FIG. 3A). In embodiments, doubler plate 42 may be coated with corrosion preventative C.

Figure 17A:
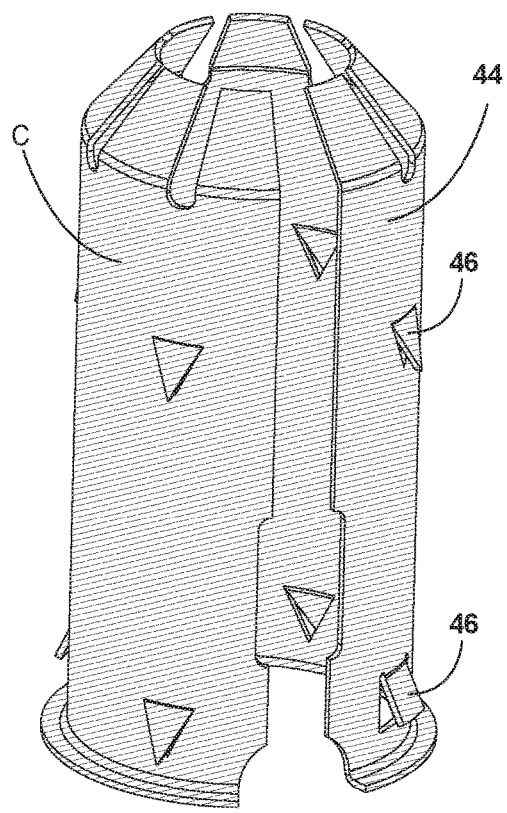
FIG. 17A is a perspective view generally illustrating embodiments of a retainer bracket associated with a hydraulic body mount, in accordance with teachings of the present disclosure.
Figure 17B:
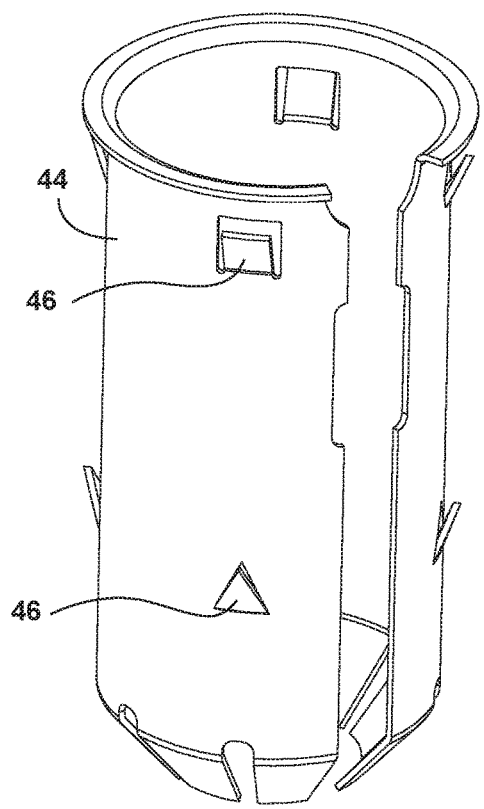
FIG. 17B is a perspective view generally illustrating embodiments of a retainer bracket associated with a hydraulic body mount, in accordance with teachings of the present disclosure.

FIGS. 17A-17B generally illustrate embodiments of retainer bracket 44 that may be associated with the hydraulic body mount 10. Retainer bracket 44 may be constructed of metal (e.g., steel). Retainer bracket 44 may be configured in a generally cylindrical shape. In embodiments, one end of retainer bracket 44 may include a segmented, truncated cone portion that may be configured to engage (e.g., be inserted into), inner shaft 12. Retainer bracket 44 may include tabs 46. Tabs 46 of retainer bracket 44 may be configured to press (e.g., bend, crimp), against components of hydraulic body mount 10, such as, but not limited to, inner shaft 12, and/or crash washer 40. In embodiments, tabs 46 may engage inner shaft 12 via a frictional and/or interference fit. In embodiments, retainer bracket 44 may be coated with corrosion preventative C.

Figures 18A, 18B:
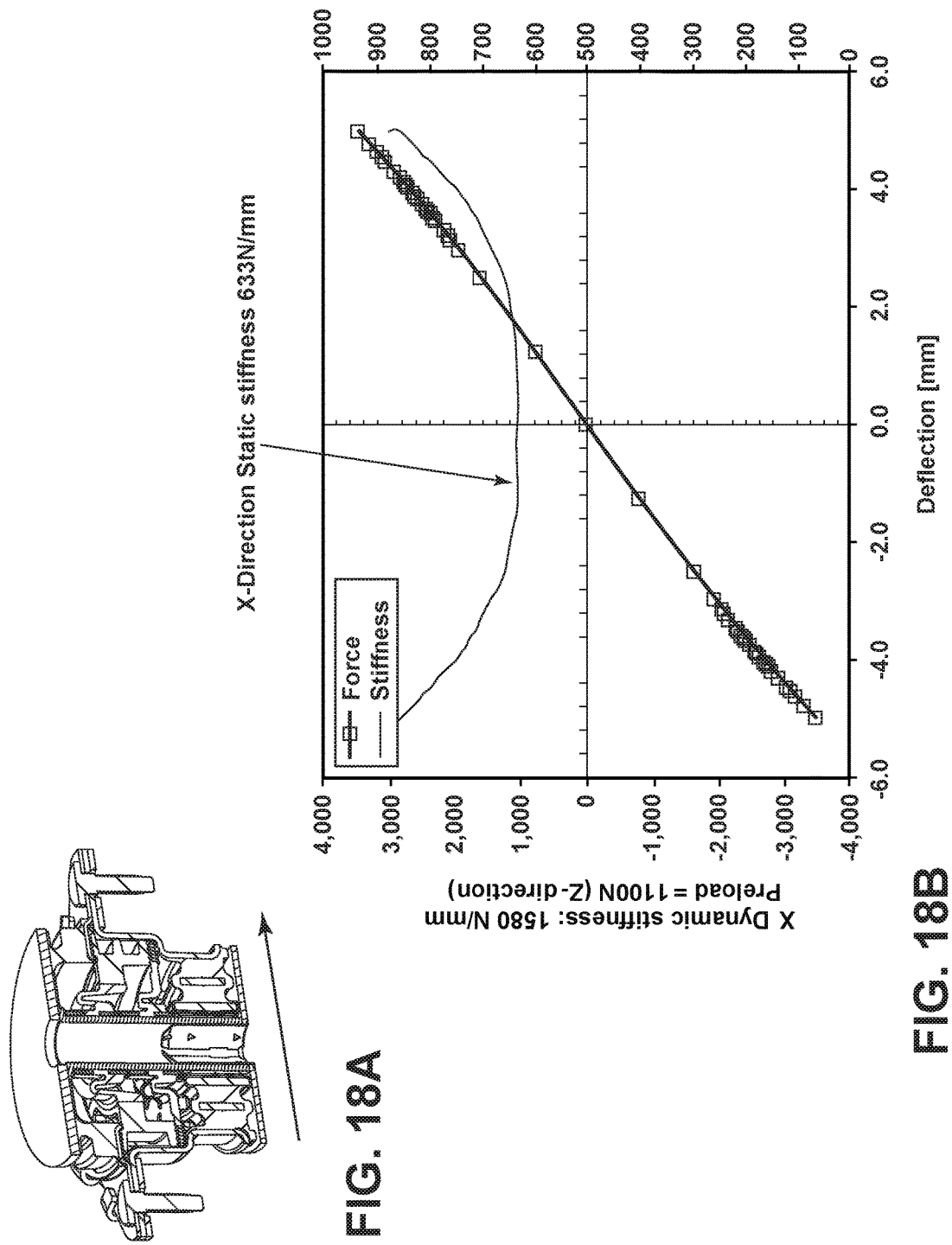
FIG. 18A is a perspective cross-sectional view generally illustrating performance aspects associated with embodiments hydraulic body mount, embodying teachings of the present disclosure.
FIG. 18B is a chart generally illustrating performance aspects associated with embodiments hydraulic body mount, embodying teachings of the present disclosure.

FIGS. 18A-18B generally include an illustration and a performance chart, respectively, associated with an embodiment of the hydraulic body mount 10 and X-direction stiffness. For example and without limitation, applying 1100 N in the Z-direction (vertical) (i.e., X-direction is fore-aft and Y-direction is cross-car), to hydraulic body mount 10 may result in a high level of dynamic and static stiffness (approximately 1580 N/mm and 633 N/mm, respectively) relative to the Y-direction, as will be seen below. The high level of stiffness in the X-direction may be at least partially a result of the orientation and/or configuration of a rate plate 34 molded into lower bushing 36 of hydraulic body mount 10. Rate plate 34, when molded into lower bushing 36 and/or outer can 32, may provide a high level of stiffness in the X-direction due at least partially to the compression of the rubber of lower bushing 36 in the X-direction. As generally illustrated in FIGS. 13A-13B, rate plate 34 may be oriented in the X-direction. In embodiments, due to inner shaft 12 being inserted into lower bushing 36, lower bushing 36 and/or rate plate 34 may be compressed, increasing the stiffness of lower bushing 36 in the X-direction. In this embodiment, rate plate 34 may compress lower bushing 36 in the X-direction. As a result, the rubber of lower bushing 36 in the X-direction may be more compressed and therefore may have more stiffness than in the Y-direction.

Figures 18C, 18D:
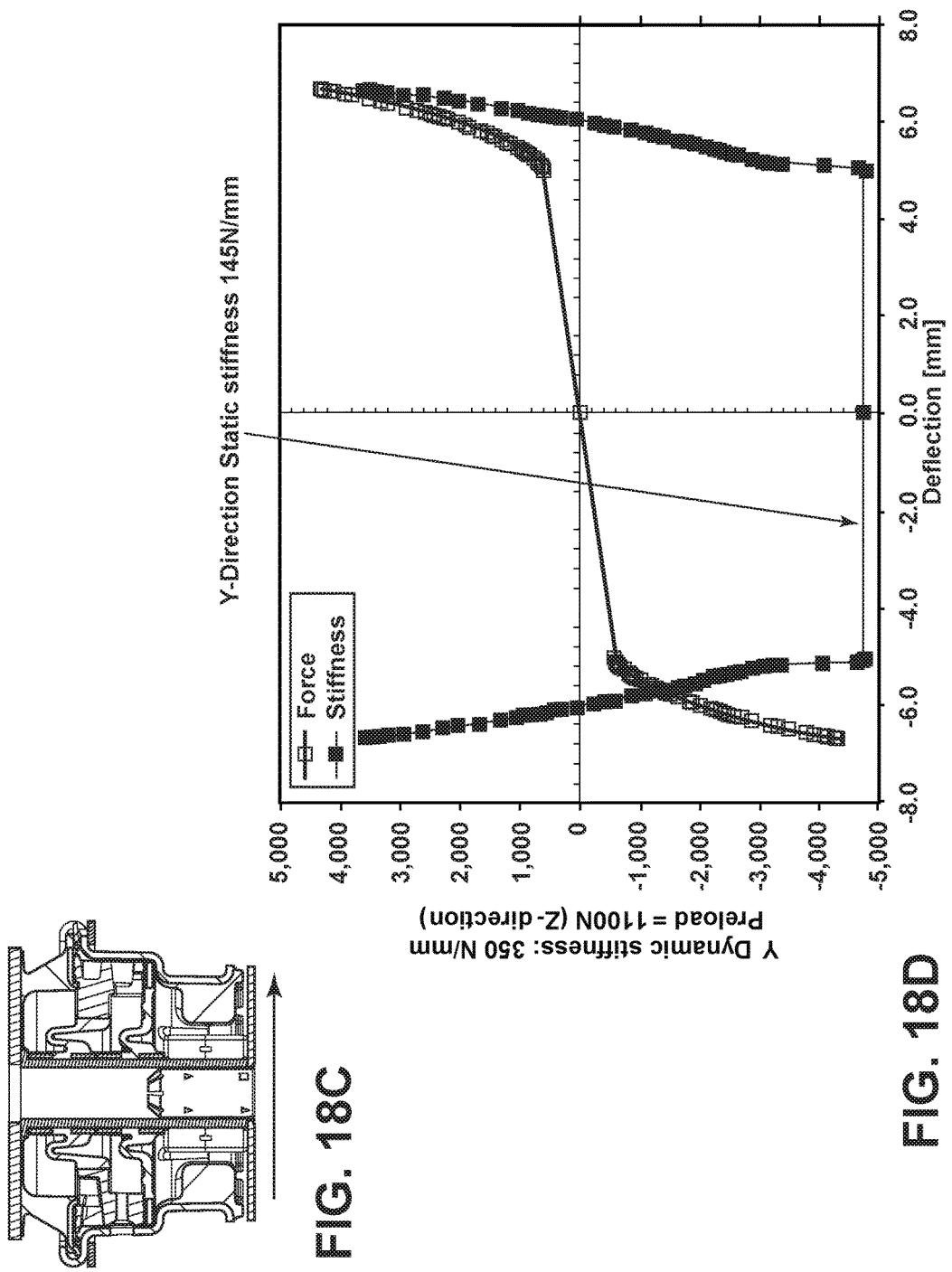
FIG. 18C is a perspective cross-sectional view generally illustrating performance aspects associated with embodiments hydraulic body mount, embodying teachings of the present disclosure.
FIG. 18D is a chart generally illustrating performance aspects associated with embodiments hydraulic body mount, embodying teachings of the present disclosure.

FIGS. 18C-18D generally include an illustration and a performance chart, respectively, associated with an embodiment of the hydraulic body mount 10 and Y-direction stiffness. For example and without limitation, applying 1100 N in the Z-direction (vertical) to hydraulic body mount 10 may result in a low level of dynamic and static stiffness (approximately 350 N/mm and 145 N/mm, respectively) relative to the X-direction. The low level of stiffness in the Y-direction may be at least partially a result of the orientation and/or configuration of a rate plate 34 molded into lower bushing 36 and/or outer can 32 of hydraulic body mount 10. Rate plate 34, when molded into lower bushing 36 and/or outer can 32, may provide a low level of stiffness in the Y-direction due at least partially to the compression of the rubber of lower bushing 36 in the Y-direction. As generally illustrated in FIGS. 13A-13B, rate plate 34 may be oriented in the X-direction. In embodiments, due to inner shaft 12 being inserted into lower bushing 36, lower bushing 36 and/or rate plate 34 may be compressed, increasing the stiffness of lower bushing 36 in the X-direction. In this embodiment, rate plate 34 may not compress lower bushing 36 in the Y-direction. As a result, the rubber of lower bushing 36 in the Y-direction may have less stiffness than in the X-direction.

Figure 18E:
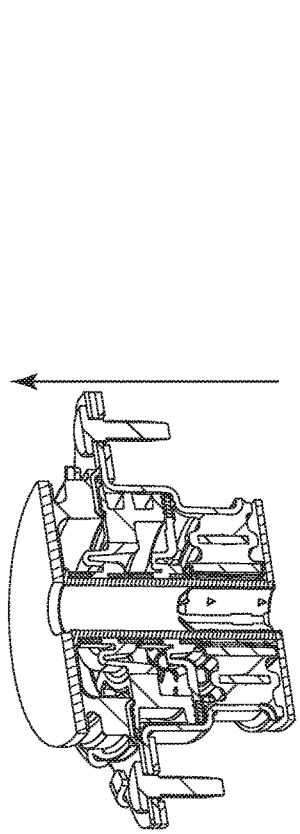
FIG. 18E is a perspective cross-sectional view generally illustrating performance aspects associated with embodiments hydraulic body mount, embodying teachings of the present disclosure.
Figure 18F:
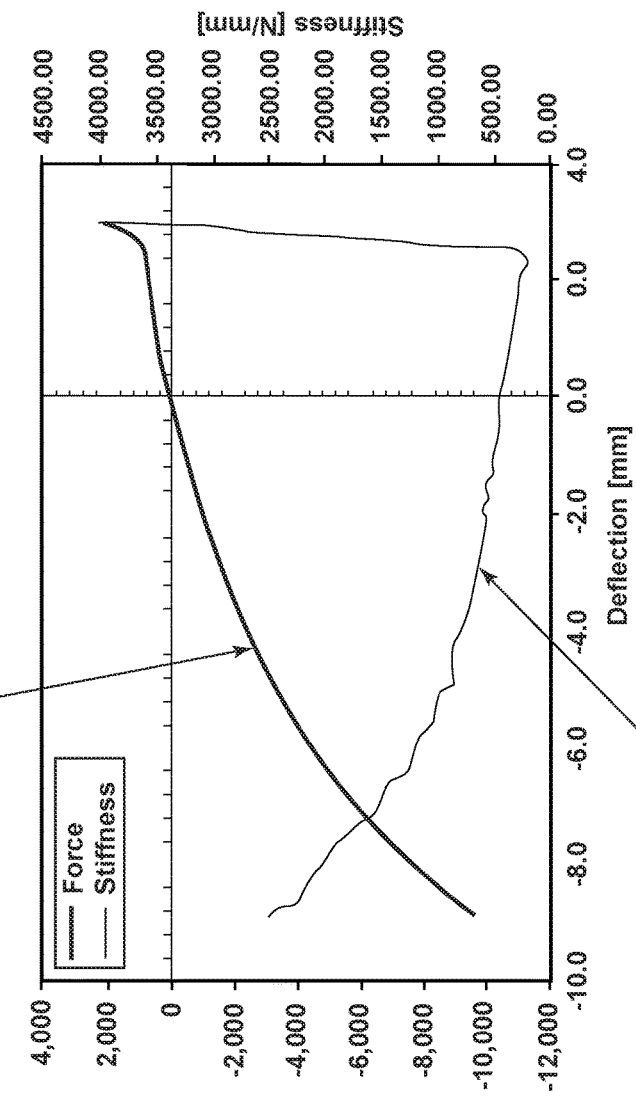
FIG. 18F is a chart generally illustrating performance aspects associated with embodiments hydraulic body mount, embodying teachings of the present disclosure.

FIGS. 18E-18F generally include an illustration and a performance chart, respectively, associated with an embodiment of the hydraulic body mount 10 and Z-direction stiffness. For example and without limitation, applying 1100 N in the Z-direction (vertical) to hydraulic body mount 10 may result in a high level of dynamic and static stiffness (approximately 1500 N/mm and 600 N/mm, respectively). As the load may be applied in the Z-direction, as generally illustrated in FIG. 18E, rate plate 34 and/or lower bushing 36 of hydraulic body mount 10 may have less impact (e.g., effect), on level of stiffness than the circulation (e.g., flow), of fluid (e.g., glycol), within fluid track 24, upper chamber 64, and/or lower chamber 66 of hydraulic body mount 10. In embodiments, glycol may completely fill the space defined by fluid track 24, upper chamber 64, and/or lower chamber 66 leaving no gases (e.g., air), present. Due to the known near-incompressibility of fluids, main rubber element ("MRE") 20, an upper bellows 26, and/or lower bellows 30 of hydraulic body mount 10 may have limited movement due to the physical connection of inner shaft 12, plate 14, mounting bracket 18, MRE 20, outer can 32, and/or lower bushing 36. In other words, movement in the Z-direction is decoupled (e.g., disconnected), from movement in the X- and/or Y-directions due at least partially to the physical connection of inner shaft 12, plate 14, mounting bracket 18, MRE 20, outer can 32, and/or lower bushing 36. Additionally and alternatively, the pumping of glycol contained within hydraulic body mount 10 provides stiffness (e.g., resistance to movement), in the Z-direction separate from stiffness that may be provided by rate plate 34 and/or lower bushing 36 of hydraulic body mount 10 in the X- and/or Y-directions.

It should be understood that the performance charts and related data detailed in FIGS. 18A-18E is to be considered by those of ordinary skill in the art to understand that the performance charts and related data described and illustrated herein are non-limiting examples, and thus it can be appreciated that the specific structural and functional details disclosed herein may be representative and do not necessarily limit the scope of the embodiments.

In embodiments, the position of rate plate 34 in lower bushing 36 of the hydraulic body mount 10 may affect the stiffness and/or dampening in the X-, Y-, and Z-directions. For example and without limitation, if rate plate 34 (as shown in FIGS. 12A-12E and FIGS. 13A-13C) were rotated 90 degrees, the stiffness and/or dampening as detailed above may be reversed, such that dynamic and static stiffness in the Y-direction would be approximately 1580 N/mm and 633 N/mm, respectively, applying 1100N in the Z-direction (vertical) and dynamic and static stiffness in the X-direction would be approximately 350 N/mm and 145 N/mm, respectively, applying 1100N in the Z-direction (vertical). The dynamic and static stiffness in the Z-direction (approximately 1500 N/mm and 600 N/mm, respectively, applying 1100N in the Z-direction (vertical)) would be unchanged. In this way, the position (e.g., orientation), of rate plate 34 may permit hydraulic body mount 10 to be tuned (e.g., adjusted, customized), for a particular application on a vehicle.

In embodiments, the shape and/or configuration of rate plate 34 may permit different levels of dynamic and/or static stiffness. For example and without limitation, if rate plate 34 were configured with more material (e.g., thicker), additional displacement (e.g., compression), of the material (e.g., rubber), of lower bushing 36 may occur, particularly during the insertion of inner shaft 12 (e.g., forced), into opening 80 in lower bushing 36. Additionally and alternatively, if rate plate 34 were configured with less material (e.g., thinner), less displacement of lower bushing 36 may occur, even during insertion of inner shaft 12 into opening 80 of lower bushing 36.

Figure 19:
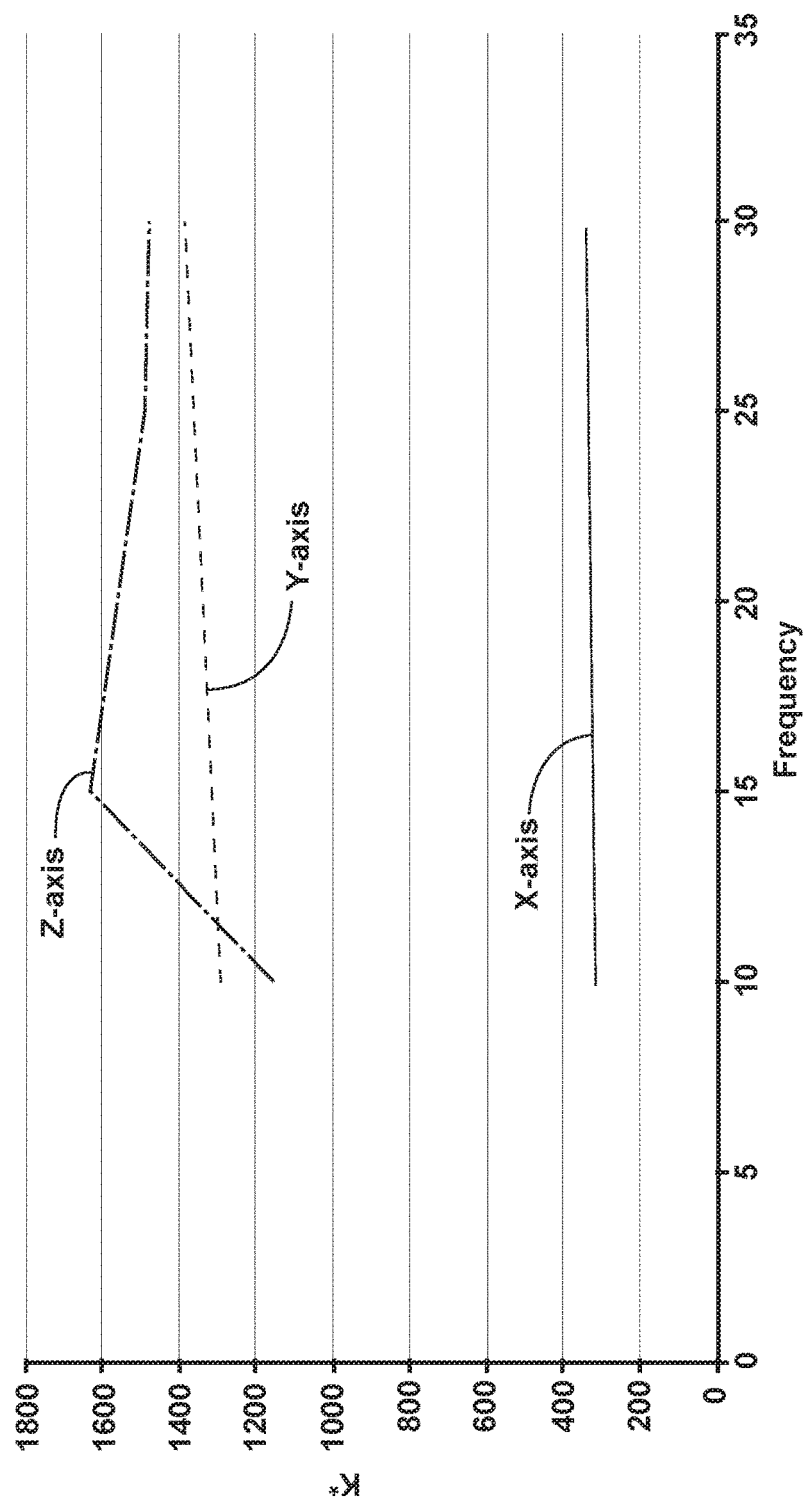
FIG. 19 is a chart generally illustrating performance aspects associated with embodiments of a hydraulic body mount, embodying teachings of the present disclosure.

FIG. 19 generally illustrates an exemplary performance chart that may be associated with the hydraulic body mount 10 with respect to damping and stiffness in the X-, Y-, and Z-directions. The position and/or shape of rate plate 34 and/or the arrangement of passages 58 of fluid track 24 of hydraulic body mount 10 may permit the adjustment (e.g., tuning) of hydraulic body mount 10 to desired stiffness rate ratios in a range of approximately 5-20 Hz. Hydraulic body mount 10 may be tuned via fluid track 24 and/or rate plate 34 to produce a range of rate ratios (rate ratios being the relationship between stiffness factor K* at a frequency (e.g., 11 Hz). For example and without limitation, hydraulic body mount 10 may be configured via fluid track 24 and/or rate plate 34 to permit rate ratios of: 4:1—Z to Y and 1:1 Z to X at 11 Hz. Additionally and alternatively, hydraulic body mount 10 may permit rate ratios ranging from at least 4.5:1—Z to Y, 1:1—Z to X to 7:1—Z to Y, 2.5:1—Z to X. As generally illustrated in FIG. 19, the stiffness factor K* value in the Z-direction (up/down) may be higher than in the X-direction or the Y-direction, from a frequency range of approximately 10 Hz to 40 Hz. As a result, the body of a vehicle may resist up/down movement over the frequencies exhibited during vehicle operation. Similarly, the stiffness factor K* value in the X-direction may be less than in the Z-direction, but may still be more than in the Y-direction, over the same frequency range. As a result, the body of a vehicle may resist fore/aft movement over the frequencies exhibited during vehicle operation. The stiffness factor K* value in the Y-direction may be less than both the Z-direction and X-direction, over the same frequency range. As a result, the body of a vehicle may have less resistance to lateral (i.e., cross/car), movement over the frequencies exhibited during vehicle operation.

Figure 20A:
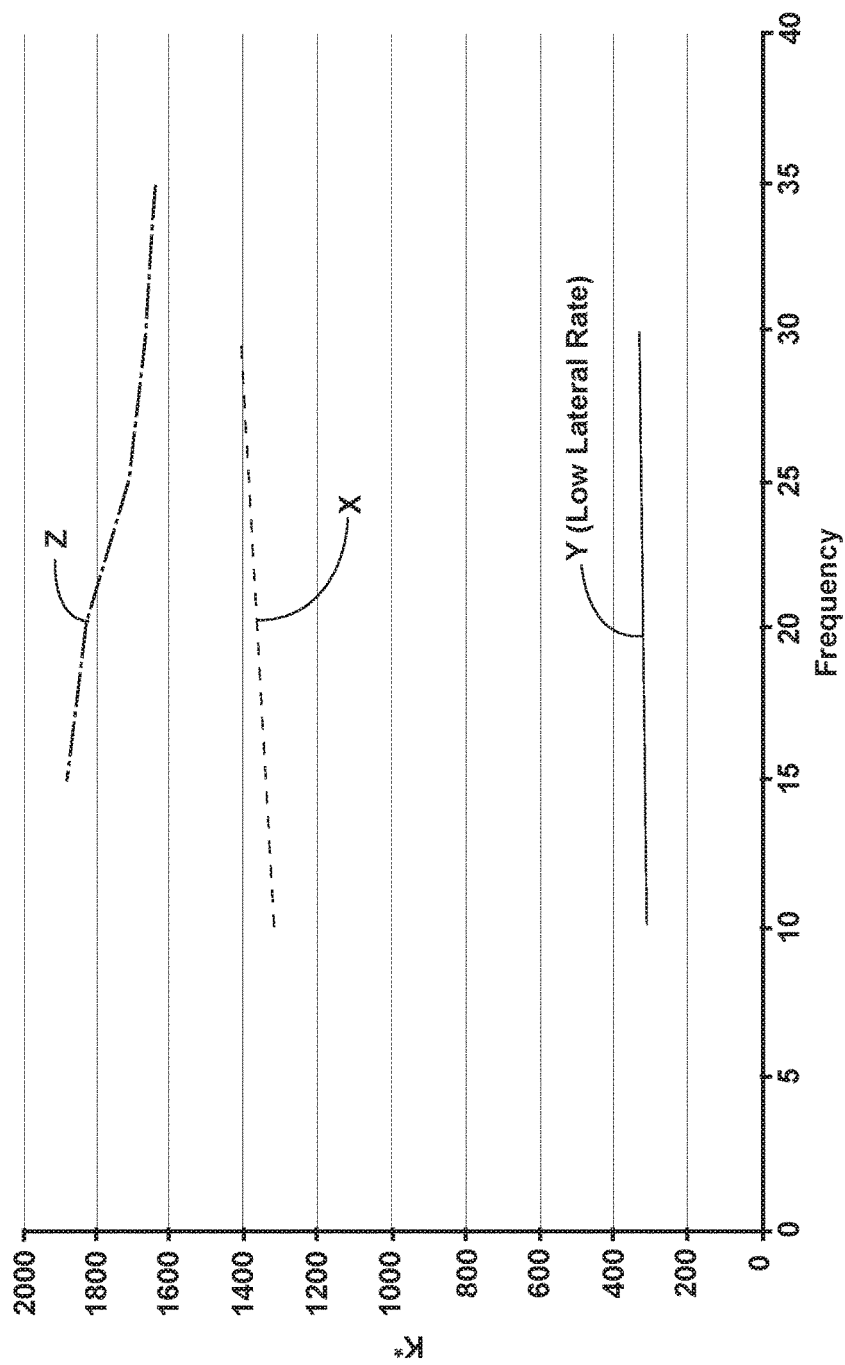
FIG. 20A is a chart generally illustrating performance aspects associated with embodiments of a hydraulic body mount, embodying teachings of the present disclosure.
Figure 20B:
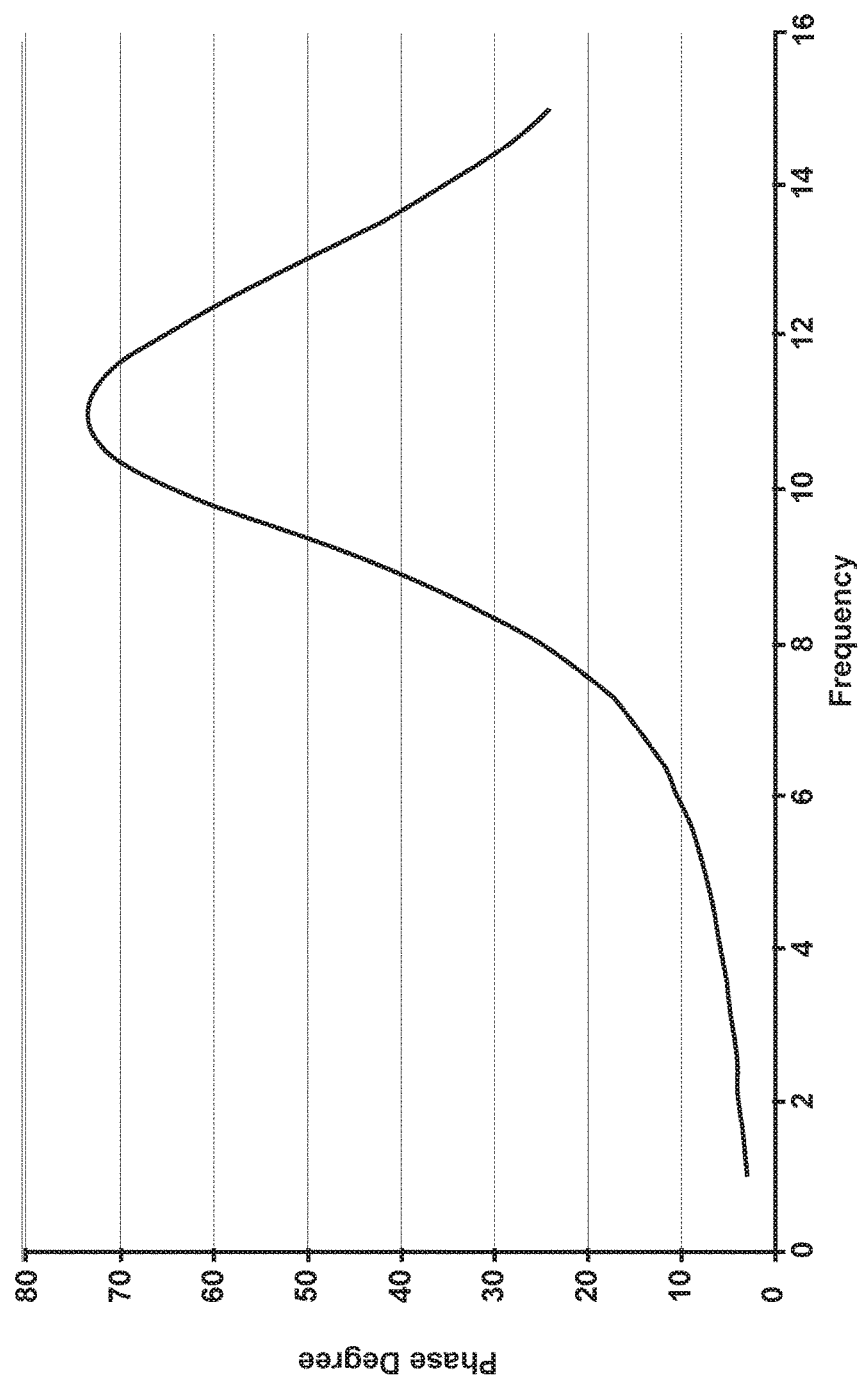
FIG. 20B is a chart generally illustrating performance aspects associated with embodiments of a hydraulic body mount, embodying teachings of the present disclosure.

FIGS. 20A-B generally illustrate exemplary performance charts associated with a hydraulic body mount 10 with respect to damping in the Z-direction. The position and/or shape of fluid track 24 of hydraulic body mount 10 may permit the adjustment (e.g., tuning), of hydraulic body mount 10 to a desired phase angle, for example and without limit of approximately 65-75 degrees, 0.2 mm peak to peak.

Hydraulic body mount 10 may be tuned via fluid track 24 to produce a range of phase angles (phase angles being the relationship between degree and frequency). For example and without limitation, hydraulic body mount 10 may be configured via fluid track 24 to meet a phase of 60 degrees at 11 Hz, 50 degrees at 8 Hz, to 70 degrees at 12 Hz. All by manipulating the size and length of the track in fluid track 24. A smaller and longer track may result in a higher phase degree and lower frequency or vice versa.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise), are only used for identification purposes to aid the reader's understanding of the present disclosure, and do not create limitations, particularly as to the position, orientation, or use of embodiments.

Joinder references (e.g., attached, coupled, connected, and the like), are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

Although only certain embodiments have been described above with a certain degree of particularity, those skilled in the art could make numerous alterations to the disclosed embodiments without departing from the scope of this disclosure. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A hydraulic body mount assembly, the assembly comprising:
   an inner shaft;
   a plate secured to the inner shaft;
   a main rubber element formed about at least a portion of the inner shaft, plate, and a mounting bracket;
   an upper bellows formed about a fluid track, the upper bellows configured to engage the inner shaft;
   a lower bellows configured to engage the inner shaft and the fluid track;
   an outer can including a lower bushing and a rate plate, wherein the lower bushing and the rate plate is configured to receive the inner shaft, mounting bracket, upper bellows, fluid track, and lower bellows; and
   a retainer bracket that secures a crash washer to the lower bushing via the inner shaft.

2. The hydraulic body mount assembly of claim 1, wherein the rate plate includes a plurality of members joined by at least one frangible element.

3. The hydraulic body mount assembly of claim 1, wherein the rate plate is configured at least partially encapsulated within the lower bushing.

4. The hydraulic body mount assembly of claim 3, wherein the rate plate is configured to at least partially deform upon insertion of the inner shaft into the lower bushing and the rate plate.

5. The hydraulic body mount assembly of claim 1, wherein at least a portion of at least one of the inner shaft, the plate, the mounting bracket, the first inner ring, the second inner ring, the washer, the outer can, the fluid track, the rate plate, the crash washer, the doubler plate, and the retainer bracket are coated with at least one of a corrosion preventer, a primer, and an adhesive.

6. The hydraulic body mount assembly of claim 1, wherein the upper bellows includes a first inner ring with at least one hole and the lower bellows includes a second inner ring with at least one hole and a washer.

7. The hydraulic body mount assembly of claim 1, wherein the fluid track includes at least one fluid fill port and at least one fluid passage.

8. The hydraulic body mount assembly of claim 7, wherein the fluid track is configured to receive a liquid via the fluid fill port.

9. A method for producing a hydraulic body mount, the method comprising:
securing an inner shaft to a plate;
molding a main rubber element about the inner shaft, the plate, and a mounting bracket;
securing an upper bellows to a fluid track;
inserting the upper bellows and the fluid track onto the inner shaft and sealing against the mounting bracket;
inserting a lower bellows onto the inner shaft and sealing against the fluid track and the upper bellows;
overmolding at least a portion of a rate plate into an outer can, forming a lower bushing;
inserting the outer can, lower bushing, and the rate plate onto the inner shaft;
securing a doubler plate on the outer can; and
installing a crash washer onto the lower bushing and the inner shaft, wherein the crash washer is secured to the inner shaft and lower bushing via a retainer bracket.

10. The hydraulic body mount assembly of claim 1, wherein the rate plate includes a plurality of members joined by at least one frangible element.

11. The hydraulic body mount assembly of claim 1, wherein the rate plate is configured to be at least partially encapsulated within the lower bushing.

12. The hydraulic body mount assembly of claim 11, wherein the rate plate is configured to at least partially deform upon insertion of the inner shaft into the lower bushing and the rate plate.

13. The method of claim 9, wherein upper bellows is formed to include a first inner ring.

14. The method of claim 9, wherein the lower bellows is formed to include a second inner ring and a washer and is secured to the fluid track via an adhesive.

15. The method of claim 9, further comprising coating at least a portion of the inner shaft, the plate, the mounting bracket, the first inner ring, the second inner ring, the washer, the outer can, the fluid track, the rate plate, the crash washer, the doubler plate, and the retainer bracket with at least one of a corrosion preventer, a primer, and an adhesive.

16. The method of claim 9, further comprising evacuating the fluid track by applying a vacuum and filling the fluid track with at least one liquid via the fluid fill port.

17. A hydraulic body mount assembly, the assembly comprising:
an inner shaft;
a plate secured to the inner shaft;
a main rubber element formed about the inner shaft, plate, and a mounting bracket;
a fluid track including an upper bellows and a lower bellows, the upper bellows and the lower bellows configured to engage the inner shaft and the fluid track;
an outer can including a lower bushing and a rate plate, wherein the lower bushing and the rate plate are configured to receive the inner shaft, mounting bracket, upper bellows, fluid track, and lower bellows; and
a retainer bracket that secures a crash washer to the lower bushing via the inner shaft.

18. The hydraulic body mount assembly of claim 17, wherein the rate plate includes a plurality of members joined by at least one frangible element.

19. The hydraulic body mount assembly of claim 17, wherein the rate plate is configured to be at least partially encapsulated within the lower bushing.

20. The hydraulic body mount assembly of claim 17, wherein when the inner shaft is inserted into the outer can, at least a portion of the rate plate and the lower bushing is deformed.

* * * * *